(12) United States Patent
Li et al.

(10) Patent No.: US 10,939,384 B2
(45) Date of Patent: Mar. 2, 2021

(54) POWER CONTROL METHOD AND APPARATUS

(71) Applicant: Huawei Technologies Co., Ltd., Shenzhen (CN)

(72) Inventors: Junchao Li, Shanghai (CN); Yafei Wang, Shanghai (CN); Hao Tang, Shanghai (CN); Zhenfei Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/568,999

(22) Filed: Sep. 12, 2019

(65) Prior Publication Data

US 2020/0008155 A1 Jan. 2, 2020

Related U.S. Application Data

(63) Continuation of application No. PCT/CN2018/108941, filed on Sep. 30, 2018.

(30) Foreign Application Priority Data

Sep. 30, 2017 (CN) .......................... 201710918975.6

(51) Int. Cl.
*H04W 52/14* (2009.01)
*H04L 5/00* (2006.01)
(Continued)

(52) U.S. Cl.
CPC ......... *H04W 52/143* (2013.01); *H04L 5/0092* (2013.01); *H04W 52/10* (2013.01); *H04W 72/0473* (2013.01)

(58) Field of Classification Search
CPC ............... H04W 52/143; H04W 52/10; H04W 72/0473; H04L 5/0092
See application file for complete search history.

(56) References Cited

U.S. PATENT DOCUMENTS

| | | | | |
|---|---|---|---|---|
| 8,599,962 B1 * | 12/2013 | Loeb | ..................... | H03F 1/3247 |
| | | | | 375/296 |
| 2009/0130979 A1 * | 5/2009 | Bhushan | ............. | H04W 52/243 |
| | | | | 455/63.1 |

(Continued)

FOREIGN PATENT DOCUMENTS

| | | |
|---|---|---|
| CN | 101527958 A | 9/2009 |
| CN | 101861755 A | 10/2010 |
| CN | 102656837 A | 9/2012 |

OTHER PUBLICATIONS

Safjan et al, Open Loop Power Control parameter settings impact on LTE HetNet uplink performance, IEEE, Jun. 2013, 5 pages (Year: 2013).*

(Continued)

*Primary Examiner* — Mounir Moutaouakil
(74) *Attorney, Agent, or Firm* — Slater Matsil, LLP

(57) ABSTRACT

A power control method, including receiving indication information, where the indication information indicates a power control parameter specific to a bandwidth part, and sending uplink information on the bandwidth part by using a transmit power, where the transmit power is based on the power control parameter specific to the bandwidth part and is further based on a common power control parameter of a carrier in which the bandwidth part is disposed.

22 Claims, 5 Drawing Sheets

(51) Int. Cl.
*H04W 52/10* (2009.01)
*H04W 72/04* (2009.01)

(56) References Cited

U.S. PATENT DOCUMENTS

| | | | | |
|---|---|---|---|---|
| 2010/0323744 | A1* | 12/2010 | Kim | H04W 52/06 455/522 |
| 2011/0151790 | A1 | 6/2011 | Khandekar et al. | |
| 2012/0207119 | A1* | 8/2012 | Zhang | H04L 5/0023 370/329 |
| 2013/0121264 | A1* | 5/2013 | Heo | H04W 52/346 370/329 |
| 2018/0124708 | A1* | 5/2018 | Davydov | H04W 52/143 |
| 2019/0174429 | A1* | 6/2019 | Wang | H04W 52/383 |

OTHER PUBLICATIONS

"3rd Generation Partnership Project; Technical Specification Group Radio Access Network; Evolved Universal Terrestrial Radio Access (E-UTRA); Physical layer procedures (Release 13)," 3GPP TS 36.213 V13.7.0, Sep. 2017, 390 pages.

"3rd Generation Partnership Project; Technical Specification Group Radio Access Network; NR; Physical layer procedures for control (Release 15)," 3GPP TS 38.213 V1.0.0, Sep. 2017, 16 pages.

"Remaining Details of BWP," Agenda Item: 6.1.3.5, Source: InterDigital, Inc., Document for: Discussion, Decision, 3GPP TSG RAN WG1 Meeting #90, R1-1714117, Prague, Czech Republic, Aug. 21-25, 2017, 4 pages.

3GPP TS 36.213, V14.4.0: 3rd Generation Partnership Project; Technical Specification Group Radio Access Network; Evolved Universal Terrestrial Radio Access (E-UTRA); Physical layer procedures (Release 14), Sep. 2017, 42 pages.

"NR UL Power Control Framework," Source: vivo, Agenda Item: 6.7.1, Document for Discussion and Decision, 3GPP TSG RAN WG1 NR Ad Hoc #3, R1-1715651, Sep. 18-21, 2017, 6 pages.

"Discussion on UL Power Control for NR," Agenda Item: 6.7.1, Source: LG Electronics, Document for: Discussion and Decision, 3GPP TSG RAN WG1 Meeting NR#3, R1-1715902, Sep. 18-21, 2017, 8 pages.

* cited by examiner

POWER CONTROL METHOD AND APPARATUS

CROSS-REFERENCE TO RELATED APPLICATIONS

This application is a continuation of International Application No. PCT/CN2018/108941, filed on Sep. 30, 2018, which claims priority to Chinese Patent Application No. 201710918975.6, filed on Sep. 30, 2017. The disclosures of the aforementioned applications are hereby incorporated by reference in their entireties.

TECHNICAL FIELD

This application relates to communications technologies, and in particular, to a power control method and apparatus.

BACKGROUND

In a communications system in which carrier bandwidth is large bandwidth, a bandwidth capability of a terminal device may be less than the carrier bandwidth. For example, in a 5th generation (5G) mobile communications system, a bandwidth capability of a terminal device is lower than carrier bandwidth. In the 5G system, a network device configures a part of carrier bandwidth (referred to as a "carrier bandwidth part (BWP)" below) in the carrier bandwidth for the terminal device, and allocates some or all resources in the carrier bandwidth part to the terminal device, for communication between the network device and the terminal device. Bandwidth of the carrier bandwidth part is less than or equal to the bandwidth capability of the terminal device.

In some application scenarios, the network device determines that carrier bandwidth part switching needs to be performed for the terminal device. Because carrier bandwidth parts with different bandwidth sizes may be corresponding to different transmission parameters, how to perform power control in a scenario in which a carrier bandwidth part is configured, to ensure correct reception of uplink information is a problem that urgently needs to be resolved.

SUMMARY

Embodiments of this application provide a power control method and apparatus, so as to configure different power control parameters based on different carrier bandwidth parts, thereby ensuring uplink signal quality (or uplink coverage) during carrier bandwidth part switching.

According to a first aspect, an embodiment of this application provides a power control method, including: receiving power control parameter indication information, sending first uplink information on a first carrier bandwidth part based on a first transmit power, where the first transmit power is determined based on a first power control parameter, and the first power control parameter is determined based on the power control parameter indication information, and sending second uplink information on a second carrier bandwidth part based on a second transmit power, where the second transmit power is determined based on a second power control parameter, and the second power control parameter is determined based on the power control parameter indication information, where the first carrier bandwidth part and the second carrier bandwidth part are located in a same carrier.

In the power control method embodiment provided in the first aspect, a terminal device receives the power control parameter indication information sent by a network device, and determines, based on the power control parameter indication information, the first power control parameter corresponding to the first carrier bandwidth part and the second power control parameter corresponding to the second carrier bandwidth part. Further, the terminal device sends the first uplink information to the network device on the first carrier bandwidth part based on the first transmit power (determined based on the first power control parameter), and sends the second uplink information to the network device on the second carrier bandwidth part based on the second transmit power (determined based on the second power control parameter). It can be learned that the network device configures different power control parameters for the terminal device based on different carrier bandwidth parts, so that the terminal device may send information on different carrier bandwidth parts of a same carrier by using different transmit powers, thereby ensuring uplink signal quality (or uplink coverage) during carrier bandwidth part switching.

In a possible implementation, the first power control parameter includes a first open-loop power control parameter, and the second power control parameter includes a second open-loop power control parameter.

In a possible implementation, the first power control parameter includes a first closed-loop power control parameter, and the second power control parameter includes a second closed-loop power control parameter.

In a possible implementation, that the first power control parameter is determined based on the power control parameter indication information includes: the first power control parameter is determined based on a reference power control parameter, a reference transmission parameter, and a transmission parameter of the first carrier bandwidth part, and that the second power control parameter is determined based on the power control parameter indication information includes: the second power control parameter is determined based on a reference power control parameter, a reference transmission parameter, and a transmission parameter of the second carrier bandwidth part, where the reference power control parameter is determined based on the power control parameter indication information.

In a possible implementation, the reference transmission parameter includes reference bandwidth, the transmission parameter of the first carrier bandwidth part includes first bandwidth of the first carrier bandwidth part, and the transmission parameter of the second carrier bandwidth part includes second bandwidth of the second carrier bandwidth part, the reference transmission parameter includes a reference subcarrier spacing, the transmission parameter of the first carrier bandwidth part includes a first subcarrier spacing of the first carrier bandwidth part, and the transmission parameter of the second carrier bandwidth part includes a second subcarrier spacing of the second carrier bandwidth part, and/or the reference transmission parameter includes a reference cyclic prefix type, the transmission parameter of the first carrier bandwidth part includes a first cyclic prefix type of the first carrier bandwidth part, and the transmission parameter of the second carrier bandwidth part includes a second cyclic prefix type of the second carrier bandwidth part.

In a possible implementation, the first power control parameter includes the first open-loop power control parameter, the second power control parameter includes the second open-loop power control parameter, and the reference power control parameter includes a reference open-loop power control parameter.

In a possible implementation, the first power control parameter includes the first closed-loop power control parameter, the second power control parameter includes the second closed-loop power control parameter, and the reference power control parameter includes a reference closed-loop power control parameter.

In a possible implementation, the first uplink information includes data carried on a first physical uplink control channel (PUCCH), a PUCCH format of the first PUCCH is a first preset PUCCH format, and the first preset PUCCH format is some or all of first available PUCCH formats, and the second uplink information includes data carried on a second PUCCH, a PUCCH format of the second PUCCH is a second preset PUCCH format, and the second preset PUCCH format is some or all of second available PUCCH formats.

In the power control method embodiment provided in this solution, it is unnecessary to configure a plurality of power control parameters for each PUCCH format, and therefore signaling overheads generated when the network device sends the power control parameter indication information can be reduced.

In a possible implementation, that the first transmit power is determined based on a first power control parameter includes: the first transmit power is determined based on the first power control parameter and a common power control parameter, and that the second transmit power is determined based on a second power control parameter includes: the second transmit power is determined based on the second power control parameter and the common power control parameter.

Optionally, the common power control parameter is specific to a cell or a carrier.

In a possible implementation, the common power control parameter includes a common open-loop power control parameter.

In the power control method embodiment provided in this solution, the network device configures power control parameters for the terminal device in a manner of combining a configuration manner specific to a carrier bandwidth part and a configuration manner specific to a cell or a carrier, thereby achieving an objective of configuring, by the network device, different power control parameters for the terminal device based on different carrier bandwidth parts, so that the terminal device may send information on different carrier bandwidth parts of a same carrier by using different transmit powers.

According to a second aspect, an embodiment of this application provides a power control method, including: sending power control parameter indication information, where the power control parameter indication information includes a first power control parameter and a second power control parameter, the first power control parameter is used to indicate a first transmit power for transmitting data on a first carrier bandwidth part, and the second power control parameter is used to indicate a second transmit power for transmitting data on a second carrier bandwidth part, receiving first uplink information on the first carrier bandwidth part, where a transmit power of the first uplink information is the first transmit power, and receiving second uplink information on the second carrier bandwidth part, where a transmit power of the second uplink information is the second transmit power, where the first carrier bandwidth part and the second carrier bandwidth part are located in a same carrier.

In the power control method embodiment provided in the second aspect, a network device sends the power control parameter indication information to a terminal device, so that the terminal device determines, based on the received power control parameter indication information, the first power control parameter corresponding to the first carrier bandwidth part and the second power control parameter corresponding to the second carrier bandwidth part. Further, the network device receives, on the first carrier bandwidth part, the first uplink information sent by the terminal device by using the first transmit power (determined based on the first power control parameter), and receives, on the second carrier bandwidth part, the second uplink information sent by the terminal device by using the second transmit power (determined based on the second power control parameter). It can be learned that the network device configures different power control parameters for the terminal device based on different carrier bandwidth parts, so that the terminal device may send information on different carrier bandwidth parts of a same carrier by using different transmit powers, thereby ensuring uplink signal quality (or uplink coverage) during carrier bandwidth part switching.

In a possible implementation, the first power control parameter includes a first open-loop power control parameter, and the second power control parameter includes a second open-loop power control parameter.

In a possible implementation, the first power control parameter includes a first closed-loop power control parameter, and the second power control parameter includes a second closed-loop power control parameter.

In a possible implementation, the first uplink information includes data carried on a first physical uplink control channel (PUCCH), a PUCCH format of the first PUCCH is a first preset PUCCH format, and the first preset PUCCH format is some or all of first available PUCCH formats, and the second uplink information includes data carried on a second PUCCH, a PUCCH format of the second PUCCH is a second preset PUCCH format, and the second preset PUCCH format is some or all of second available PUCCH formats.

In the power control method embodiment provided in this solution, the network device does not need to configure a plurality of power control parameters for each PUCCH format, and therefore signaling overheads generated when the network device sends the power control parameter indication information can be reduced.

According to a third aspect, an embodiment of this application provides an apparatus, including: a receiving module, configured to receive power control parameter indication information, and a sending module, configured to send first uplink information on a first carrier bandwidth part based on a first transmit power, where the first transmit power is determined based on a first power control parameter, and the first power control parameter is determined based on the power control parameter indication information, where the sending module is further configured to send second uplink information on a second carrier bandwidth part based on a second transmit power, where the second transmit power is determined based on a second power control parameter, and the second power control parameter is determined based on the power control parameter indication information, where the first carrier bandwidth part and the second carrier bandwidth part are located in a same carrier.

In a possible implementation, the first power control parameter includes a first open-loop power control parameter, and the second power control parameter includes a second open-loop power control parameter.

In a possible implementation, the first power control parameter includes a first closed-loop power control parameter, and the second power control parameter includes a second closed-loop power control parameter.

In a possible implementation, that the first power control parameter is determined based on the power control parameter indication information includes: the first power control parameter is determined based on a reference power control parameter, a reference transmission parameter, and a transmission parameter of the first carrier bandwidth part, and that the second power control parameter is determined based on the power control parameter indication information includes: the second power control parameter is determined based on a reference power control parameter, a reference transmission parameter, and a transmission parameter of the second carrier bandwidth part, where the reference power control parameter is determined based on the power control parameter indication information.

In a possible implementation, the reference transmission parameter includes reference bandwidth, the transmission parameter of the first carrier bandwidth part includes first bandwidth of the first carrier bandwidth part, and the transmission parameter of the second carrier bandwidth part includes second bandwidth of the second carrier bandwidth part, the reference transmission parameter includes a reference subcarrier spacing, the transmission parameter of the first carrier bandwidth part includes a first subcarrier spacing of the first carrier bandwidth part, and the transmission parameter of the second carrier bandwidth part includes a second subcarrier spacing of the second carrier bandwidth part, and/or the reference transmission parameter includes a reference cyclic prefix type, the transmission parameter of the first carrier bandwidth part includes a first cyclic prefix type of the first carrier bandwidth part, and the transmission parameter of the second carrier bandwidth part includes a second cyclic prefix type of the second carrier bandwidth part.

In a possible implementation, the first power control parameter includes the first open-loop power control parameter, the second power control parameter includes the second open-loop power control parameter, and the reference power control parameter includes a reference open-loop power control parameter.

In a possible implementation, the first power control parameter includes the first closed-loop power control parameter, the second power control parameter includes the second closed-loop power control parameter, and the reference power control parameter includes a reference closed-loop power control parameter.

In a possible implementation, the first uplink information includes data carried on a first physical uplink control channel (PUCCH), a PUCCH format of the first PUCCH is a first preset PUCCH format, and the first preset PUCCH format is some or all of first available PUCCH formats, and the second uplink information includes data carried on a second PUCCH, a PUCCH format of the second PUCCH is a second preset PUCCH format, and the second preset PUCCH format is some or all of second available PUCCH formats.

In a possible implementation, that the first transmit power is determined based on a first power control parameter includes: the first transmit power is determined based on the first power control parameter and a common power control parameter, and that the second transmit power is determined based on a second power control parameter includes: the second transmit power is determined based on the second power control parameter and the common power control parameter.

In a possible implementation, the common power control parameter includes a common open-loop power control parameter.

In a possible implementation, the apparatus may be a terminal device, or an apparatus that can be disposed in a terminal device.

For a beneficial effect of the apparatus provided in the implementations of the third aspect, refer to the beneficial effect of the implementations of the first aspect. Details are not described herein again.

According to a fourth aspect, an embodiment of this application provides an apparatus, including: a sending module, configured to send power control parameter indication information, where the power control parameter indication information includes a first power control parameter and a second power control parameter, the first power control parameter is used to indicate a first transmit power for transmitting data on a first carrier bandwidth part, and the second power control parameter is used to indicate a second transmit power for transmitting data on a second carrier bandwidth part, and a receiving module, configured to receive first uplink information on the first carrier bandwidth part, where a transmit power of the first uplink information is the first transmit power, where the receiving module is further configured to receive second uplink information on the second carrier bandwidth part, where a transmit power of the second uplink information is the second transmit power, where the first carrier bandwidth part and the second carrier bandwidth part are located in a same carrier.

In a possible implementation, the first power control parameter includes a first open-loop power control parameter, and the second power control parameter includes a second open-loop power control parameter.

In a possible implementation, the first power control parameter includes a first closed-loop power control parameter, and the second power control parameter includes a second closed-loop power control parameter.

In a possible implementation, the first uplink information includes data carried on a first physical uplink control channel (PUCCH), a PUCCH format of the first PUCCH is a first preset PUCCH format, and the first preset PUCCH format is some or all of first available PUCCH formats, and the second uplink information includes data carried on a second PUCCH, a PUCCH format of the second PUCCH is a second preset PUCCH format, and the second preset PUCCH format is some or all of second available PUCCH formats.

In a possible implementation, the apparatus may be a network device, or an apparatus that can be disposed in a network device.

For a beneficial effect of the apparatus provided in the implementations of the fourth aspect, refer to the beneficial effect of the implementations of the second aspect. Details are not described herein again.

According to a fifth aspect, an embodiment of this application provides an apparatus. The apparatus includes a processor, configured to implement the functions of the terminal device in the method described in the first aspect. The apparatus may further include a memory, configured to store a program instruction and data. The memory is coupled with the processor. The processor may invoke and execute the program instruction stored in the memory, to implement the functions of the terminal device in the method described in the first aspect. The apparatus may further include a transceiver, where the transceiver is used by the apparatus to communicate with another device. For example, the another device is a network device.

In a possible implementation, the apparatus includes: the transceiver, the memory, configured to store the program instruction, and the processor, configured to receive power control parameter indication information by using the transceiver, where the processor is further configured to send, by using the transceiver, first uplink information on a first carrier bandwidth part based on a first transmit power, where the first transmit power is determined based on a first power control parameter, and the first power control parameter is determined based on the power control parameter indication information, and the processor is further configured to send, by using the transceiver, second uplink information on a second carrier bandwidth part based on a second transmit power, where the second transmit power is determined based on a second power control parameter, and the second power control parameter is determined based on the power control parameter indication information, where the first carrier bandwidth part and the second carrier bandwidth part are located in a same carrier.

Optionally, the first uplink information may be generated by the processor, and/or the second uplink information may be generated by the processor.

In a possible implementation, the first power control parameter includes a first open-loop power control parameter, and the second power control parameter includes a second open-loop power control parameter.

In a possible implementation, the first power control parameter includes a first closed-loop power control parameter, and the second power control parameter includes a second closed-loop power control parameter.

In a possible implementation, that the first power control parameter is determined based on the power control parameter indication information includes: the first power control parameter is determined based on a reference power control parameter, a reference transmission parameter, and a transmission parameter of the first carrier bandwidth part, and that the second power control parameter is determined based on the power control parameter indication information includes: the second power control parameter is determined based on a reference power control parameter, a reference transmission parameter, and a transmission parameter of the second carrier bandwidth part, where the reference power control parameter is determined based on the power control parameter indication information.

In a possible implementation, the reference transmission parameter includes reference bandwidth, the transmission parameter of the first carrier bandwidth part includes first bandwidth of the first carrier bandwidth part, and the transmission parameter of the second carrier bandwidth part includes second bandwidth of the second carrier bandwidth part, the reference transmission parameter includes a reference subcarrier spacing, the transmission parameter of the first carrier bandwidth part includes a first subcarrier spacing of the first carrier bandwidth part, and the transmission parameter of the second carrier bandwidth part includes a second subcarrier spacing of the second carrier bandwidth part, and/or the reference transmission parameter includes a reference cyclic prefix type, the transmission parameter of the first carrier bandwidth part includes a first cyclic prefix type of the first carrier bandwidth part, and the transmission parameter of the second carrier bandwidth part includes a second cyclic prefix type of the second carrier bandwidth part.

In a possible implementation, the first power control parameter includes the first open-loop power control parameter, the second power control parameter includes the second open-loop power control parameter, and the reference power control parameter includes a reference open-loop power control parameter.

In a possible implementation, the first power control parameter includes the first closed-loop power control parameter, the second power control parameter includes the second closed-loop power control parameter, and the reference power control parameter includes a reference closed-loop power control parameter.

In a possible implementation, the first uplink information includes data carried on a first physical uplink control channel (PUCCH), a PUCCH format of the first PUCCH is a first preset PUCCH format, and the first preset PUCCH format is some or all of first available PUCCH formats, and the second uplink information includes data carried on a second PUCCH, a PUCCH format of the second PUCCH is a second preset PUCCH format, and the second preset PUCCH format is some or all of second available PUCCH formats.

In a possible implementation, that the first transmit power is determined based on a first power control parameter includes: the first transmit power is determined based on the first power control parameter and a common power control parameter, and that the second transmit power is determined based on a second power control parameter includes: the second transmit power is determined based on the second power control parameter and the common power control parameter.

In a possible implementation, the common power control parameter includes a common open-loop power control parameter.

In a possible implementation, the apparatus may be a terminal device, or an apparatus that can be disposed in a terminal device.

For a beneficial effect of the apparatus provided in the implementations of the fifth aspect, refer to the beneficial effect of the implementations of the first aspect. Details are not described herein again.

According to a sixth aspect, an embodiment of this application provides a chip system. The chip system includes a processor, configured to implement the functions of the terminal device in the method described in the first aspect, and may further include a memory. The chip system may include a chip, or may include a chip and another discrete device.

According to a seventh aspect, an embodiment of this application provides a program. When being executed by a processor, the program is used to perform the method in the first aspect.

According to an eighth aspect, an embodiment of this application provides a computer program product including an instruction. When the instruction runs on a computer, the computer is enabled to perform the method in the first aspect.

According to a ninth aspect, an embodiment of this application provides a computer readable storage medium. The computer readable storage medium stores an instruction. When the instruction runs on a computer, the computer is enabled to perform the method in the first aspect.

According to a tenth aspect, an embodiment of this application provides an apparatus. The apparatus includes a processor, configured to implement the functions of the network device in the method described in the second aspect. The apparatus may further include a memory, configured to store a program instruction and data. The memory is coupled with the processor. The processor may invoke and execute the program instruction stored in the memory, to implement the functions of the network device in the method described in the second aspect. The apparatus may further include a transceiver, where the transceiver is used by the apparatus to communicate with another device. For example, the another device is a terminal device.

In a possible implementation, the apparatus includes: the transceiver, the memory, configured to store the program instruction, and the processor, configured to send power control parameter indication information by using the transceiver, where the power control parameter indication information includes a first power control parameter and a second power control parameter, the first power control parameter is used to indicate a first transmit power for transmitting data on a first carrier bandwidth part, and the second power control parameter is used to indicate a second transmit power for transmitting data on a second carrier bandwidth part, where the processor is further configured to receive first uplink information on the first carrier bandwidth part, where a transmit power of the first uplink information is the first transmit power, and the processor is further configured to receive second uplink information on the second carrier bandwidth part, where a transmit power of the second uplink information is the second transmit power, where the first carrier bandwidth part and the second carrier bandwidth part are located in a same carrier.

Optionally, the power control parameter indication information may be generated by the processor.

In a possible implementation, the first power control parameter includes a first open-loop power control parameter, and the second power control parameter includes a second open-loop power control parameter.

In a possible implementation, the first power control parameter includes a first closed-loop power control parameter, and the second power control parameter includes a second closed-loop power control parameter.

In a possible implementation, the first uplink information includes data carried on a first physical uplink control channel (PUCCH), a PUCCH format of the first PUCCH is a first preset PUCCH format, and the first preset PUCCH format is some or all of first available PUCCH formats, and the second uplink information includes data carried on a second PUCCH, a PUCCH format of the second PUCCH is a second preset PUCCH format, and the second preset PUCCH format is some or all of second available PUCCH formats.

In a possible implementation, the apparatus may be a network device, or an apparatus that can be disposed in a network device.

For a beneficial effect of the apparatus provided in the implementations of the tenth aspect, refer to the beneficial effect of the implementations of the second aspect. Details are not described herein again.

According to an eleventh aspect, an embodiment of this application provides a chip system. The chip system includes a processor, configured to implement the functions of the network device in the method described in the second aspect, and may further include a memory. The chip system may include a chip, or may include a chip and another discrete device.

According to a twelfth aspect, an embodiment of this application provides a program. When being executed by a processor, the program is used to perform the method in the second aspect.

According to a thirteenth aspect, an embodiment of this application provides a computer program product including an instruction. When the instruction runs on a computer, the computer is enabled to perform the method in the second aspect.

According to a fourteenth aspect, an embodiment of this application provides a computer readable storage medium. The computer readable storage medium stores an instruction. When the instruction runs on a computer, the computer is enabled to perform the method in the second aspect.

In the power control method and apparatus provided in the embodiments of this application, the network device sends the power control parameter indication information to the terminal device, so that the terminal device determines, based on the received power control parameter indication information, the first power control parameter corresponding to the first carrier bandwidth part and the second power control parameter corresponding to the second carrier bandwidth part. Further, the terminal device sends the first uplink information to the network device on the first carrier bandwidth part based on the first transmit power (determined based on the first power control parameter), and sends the second uplink information to the network device on the second carrier bandwidth part based on the second transmit power (determined based on the second power control parameter). It can be learned that the network device configures different power control parameters for the terminal device based on different carrier bandwidth parts, so that the terminal device may send information on different carrier bandwidth parts of a same carrier by using different transmit powers, thereby ensuring uplink signal quality (or uplink coverage) during carrier bandwidth part switching.

DETAILED DESCRIPTION OF ILLUSTRATIVE EMBODIMENTS

First, a communications system and some terms in the embodiments of this application are explained and described.

Figure 1A:
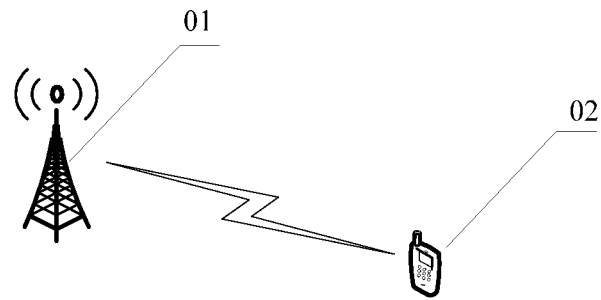
FIG. 1A is a schematic structural diagram of a communications system according to an embodiment of this application.

FIG. 1A is a schematic structural diagram of a communications system according to an embodiment of this application. As shown in FIG. 1A, the communications system may include a network device 01 and a terminal device 02. Certainly, the communications system may alternatively include a plurality of terminal devices 02. Considering that processes of configuring, by the network device 01, power control parameters for the terminal devices 02 are similar to each other, in the embodiments of this application, description is provided by using an example in which the network device 01 configures, based on different carrier bandwidth parts of any terminal device 02, different power control parameters for the terminal device 02.

In the embodiments of this application, an apparatus that performs a method on a network device side may be the network device, or may be an apparatus in the network device. For example, the apparatus in the network device may be a chip system, a circuit, or a module. This is not limited in this application.

In the embodiments of this application, an apparatus that performs a method on a terminal device (or referred to as terminal) side may be the terminal device, or may be an apparatus in the terminal device. For example, the apparatus in the terminal device may be a chip system, a circuit, or a module. This is not limited in this application. In methods provided in the embodiments of this application, the methods provided in the embodiments of this application are described by using an example in which the network device and the terminal device perform data transmission.

Optionally, the communications system may be a long term evolution (LTE) communications system or a 5G mobile communications system. Certainly, the communications system may be alternatively another type of communications system. This is not limited in the embodiments of this application.

The network device in this application may include but is not limited to a base station and a transmission reception point (TRP). The base station is also referred to as a radio access network (RAN) device, and is a device that connects a terminal to a wireless network. The base station may be a base transceiver station (BTS) in global system for mobile communications (,GSM) or code division multiple access (CDMA), or may be a NodeB (NB) in wideband code division multiple access (WCDMA), or may be an evolved NodeB (eNB or eNodeB) in long term evolution (LTE), a relay station, an access point, a base station on a future 5G network, or the like. This is not limited herein.

The terminal device in this application may be a wireless terminal or a wired terminal. The wireless terminal may be a device that provides a user with connectivity of voice and/or other service data, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile console (mobile), a remote station, a remote terminal, an access terminal, a user terminal, a user agent, or user equipment (user device or user equipment). This is not limited herein. The terminal device may also be referred to as a terminal for short.

The terminal device or the network device in this application may include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, such as a Linux operating system, a UNIX operating system, an Android operating system, an iOS operating system, or a Windows operating system. The application layer includes applications such as a browser, an address book, word processing software, and instant communication software.

A bandwidth capability of the terminal device in the embodiments of this application is maximum transmission bandwidth that can be supported by the terminal device. A larger bandwidth capability of the terminal device correspondingly indicates a higher processing capability of the terminal device and a higher data transmission rate of the terminal device, but may result in higher design costs of the terminal device and higher power consumption of the terminal device. In a wireless communications system, bandwidth capabilities of different terminal devices may be the same or different. This is not limited in the embodiments of this application. Optionally, the terminal device may report the bandwidth capability of the terminal device to the network device by using a preamble or a message 3 during initial access, or may report the bandwidth capability of the terminal device to the network device by using higher layer signaling. Certainly, the network device may alternatively obtain the bandwidth capability of the terminal device in another manner. This is not limited in the embodiments of this application.

In the embodiments of this application, the network device allocates a carrier bandwidth part for the terminal device from a system frequency resource, and allocates some or all resources in the carrier bandwidth part to the terminal device, for communication between the network device and the terminal device. Optionally, the system frequency resource may also be referred to as a system resource or a transmission resource. In frequency domain, a width of the system frequency resource may be referred to as bandwidth of the system frequency resource, or may be referred to as system bandwidth, transmission bandwidth, or carrier bandwidth.

In the embodiments of this application, one carrier bandwidth part is related to one specific system parameter. The system parameter includes at least one of a subcarrier spacing and a cyclic prefix (CP) type. Certainly, the system parameter may alternatively include another parameter. This is not limited in the embodiments of this application.

The carrier bandwidth part in the embodiments of this application is included in the system frequency resource, and may be resources that are consecutive or inconsecutive in frequency domain in the system frequency resource, or may be all resources in the system frequency resource. The carrier bandwidth part in the embodiments of this application may also be referred to as a bandwidth part, a frequency resource part, a partial frequency resource, a subband, a narrow band, or another name. This is not limited in this application.

For example, one carrier bandwidth part includes K (K>0) consecutive or inconsecutive subcarriers, or one carrier bandwidth part includes a frequency domain resource corresponding to N (N>0) non-overlapping consecutive or inconsecutive resource blocks, or one carrier bandwidth part includes a frequency domain resource corresponding to M (M>0) non-overlapping consecutive or inconsecutive resource block groups (RBG), where one RBG includes P (P>0) consecutive RBs.

Figure 1B:
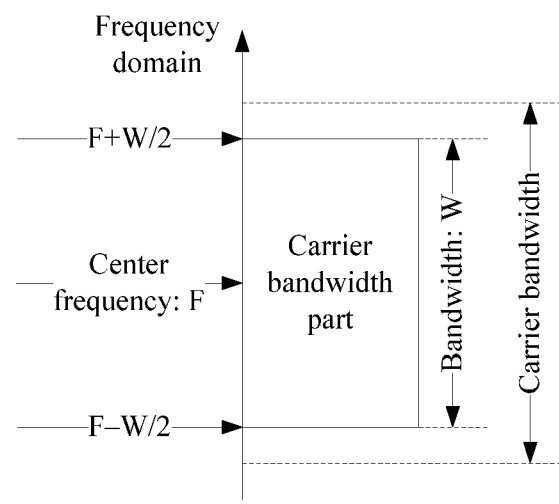
FIG. 1B is a schematic structural diagram of a carrier bandwidth part according to an embodiment of this application.

For example, when the carrier bandwidth part is a segment of consecutive resources in the system frequency resource, as shown in FIG. 1B (FIG. 1B is a schematic structural diagram of a carrier bandwidth part according to an embodiment of this application), the carrier bandwidth part may be some or all resources in carrier bandwidth. For example, bandwidth of the carrier bandwidth part is W, and a center frequency is F, therefore, frequencies at boundary points of the carrier bandwidth part are F−W/2 and F+W/2, or this may be described as that a highest frequency in the carrier bandwidth part is F+W/2 and a lowest frequency in the carrier bandwidth part is F−W/2.

Figure 1C:
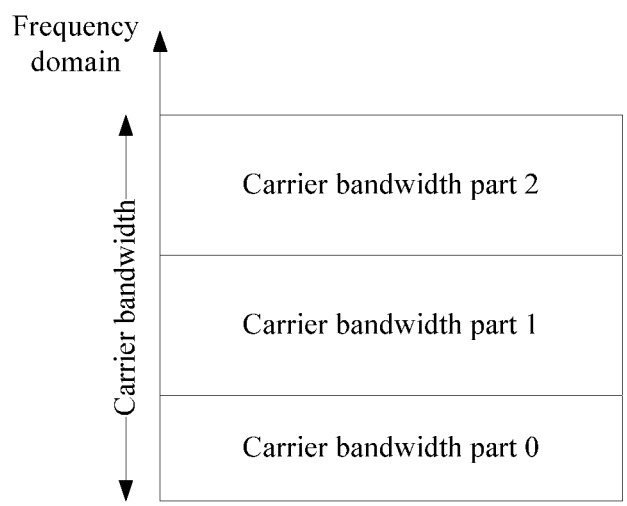
FIG. 1C is another schematic structural diagram of carrier bandwidth parts that are in carrier bandwidth and that are consecutive in frequency domain according to an embodiment of this application.

FIG. 1C is another schematic structural diagram of carrier bandwidth parts that are in carrier bandwidth and that are consecutive in frequency domain according to an embodiment of this application. As shown in FIG. 1C, the carrier bandwidth includes a total of three different carrier bandwidth parts: a carrier bandwidth part 0, a carrier bandwidth part 1, and a carrier bandwidth part 2. In actual application, the carrier bandwidth may include any integral quantity of carrier bandwidth parts. This is not limited in this application. Meanings of different carrier bandwidth parts are described by using a carrier bandwidth part A and a carrier bandwidth part B as an example. That the carrier bandwidth part A is different from the carrier bandwidth part B includes: (1) Some or all of frequency resources included in the carrier bandwidth part A are not included in the carrier bandwidth part B. (2) Some or all of frequency resources included in the carrier bandwidth part B are not included in the carrier bandwidth part A. (3) A system parameter corresponding to the carrier bandwidth part A is different from a system parameter corresponding to the carrier bandwidth part B. Optionally, the system parameter includes at least one of the following: a subcarrier spacing and a CP type. Optionally, the system parameter may include numerology used in a process of studying and formulating a wireless communications system standard by the 3rd generation partnership project (3GPP).

In the embodiments of this application, in some application scenarios (for example, a multi-numerology scenario or a bandwidth part fall-back scenario), the network device determines that carrier bandwidth part switching needs to be performed for the terminal device, and may activate or deactivate a carrier bandwidth part by using dynamic signaling. Optionally, the dynamic signaling may include downlink control information (DCI), or certainly, may include other information. This is not limited in the embodiments of this application. When the carrier bandwidth part is activated, the terminal device monitors a downlink control channel corresponding to the carrier bandwidth part, and transmits data on the carrier bandwidth part indicated by DCI transmitted on the downlink control channel, and/or performs reference signal measurement on the carrier bandwidth part. When the carrier bandwidth part is deactivated, the terminal device does not monitor the downlink control channel corresponding to the carrier bandwidth part, and/or does not transmit a reference signal on the carrier bandwidth part. It can be learned that dynamic carrier bandwidth part switching may be implemented through such dynamic activation or deactivation of the carrier bandwidth part, that is, the terminal device sends or receives data in a time division manner on different carrier bandwidth parts. It should be noted that the "downlink control channel corresponding to the carrier bandwidth part" is a downlink control channel (which may be on the carrier bandwidth part, or may not be on the carrier bandwidth part) used to schedule the carrier bandwidth part, and/or a downlink control channel that is included in the carrier bandwidth part and that is used to schedule another carrier bandwidth part.

Power control in the embodiments of this application is: on a basis of evaluating an indicator on a receiver side, such as received signal strength or a signal-to-noise ratio, changing a transmit power in a timely manner to compensate for a path loss and fading on a radio channel, thereby maintaining communication quality without generating additional interference to another terminal device on a same radio resource. In addition, power control results in a decrease in a transmitter power, thereby extending a service time of a battery. Optionally, uplink power control is mainly for a physical uplink shared channel (PUSCH), a physical uplink control channel (PUCCH), and a sounding reference signal (SRS). The PUSCH is used by the terminal device to send uplink data information. The PUCCH is used by the terminal device to send uplink control information, for example, a response (acknowledgement/negative acknowledgement, ACK/NACK) and channel quality information (CQI). The SRS is used by the network device to estimate uplink channel quality.

Numbers in the embodiments of this application, such as "first" and "second", are used to distinguish between similar objects, but are not necessarily used to describe a specific sequence or chronological order, and should not constitute any limitation on embodiments of this application.

In addition, in a possible implementation, a manner of determining, by the terminal device, an uplink transmit power based on a power control parameter configured by the network device is described in detail.

(1) It is assumed that when the terminal device sends a PUSCH (no PUCCH needs to be sent) in a subframe i of a cell c or a carrier c, a PUSCH transmit power is determined based on the following formula (1):

$$P_{PUSCH,c}(i) = \min \begin{cases} P_{CMAX,c}(i) \\ 10\log_{10}(M_{PUSCH,c}(i)) + P_{O\_PUSCH,c} + \\ \alpha_c \cdot PL_c + \Delta_{TF,c}(i) + f_c(i) \end{cases} [dBm] \quad (1)$$

where $P_{CMAX,c}(i)$ is a maximum transmit power of the terminal device in the subframe i of the cell c or the carrier c, $M_{PUSCH,c}(i)$ is a quantity of RBs that are allocated by the network device to the terminal device in the subframe i of the cell c or the carrier c, $P_{O\_PUSCH,c}$ is a receive power expected by the network device, where $P_{O\_PUSCH,c} = P_{O\_UE\_PUSCH,c} + P_{O\_NOMINAL\_PUSCH,c}$, $P_{O\_NOMINAL\_PUSCH,c}$ represents a PUSCH transmit power that is expected by the network device for normal demodulation and that is configured by using higher layer signaling, and $P_{O\_UE\_PUSCH,c}$ is a power offset, configured by using higher layer signaling, of the terminal device relative to $P_{O\_NOMINAL\_PUSCH,c}$, $PL_c$ is a downlink path loss estimate that is estimated by the terminal device, $\alpha_c$ is a path loss compensation factor configured by using higher layer signaling and has a value range from 0 to 1, $\Delta_{TF,c}(i)$ is a power offset value of a different modulation and coding scheme (modulation and coding scheme, MCS)

format relative to a reference MCS format, and $f_c(i)$ is an adjustment value of a PUSCH transmit power of the terminal device, and is obtained through mapping by using transmit power control (TPC) information in a PDCCH, where $f_c(i)$ is obtained by using a PUSCH power control algorithm, and power control includes a cumulative type and an absolute type. The cumulative type means adding a power adjustment value based on last $f_c(i)$, that is, $f_c(i)=f_c(i-1)+\delta_{PUSCH,c}(i-K_{PUSCH})$, where $\delta_{PUSCH,c}$ is a power adjustment value indicated by the TPC in the physical downlink control channel (PDCCH), $K_{PUSCH}=4$ for frequency division duplex (FDD), and $K_{PUSCH}$ is determined based on a TDD uplink-downlink configuration for time division duplex (TDD), and the absolute type means that a value of $f_c(i)$ is equal to a power adjustment value indicated by the TPC in the PDCCH.

(2) It is assumed that when the terminal device sends both a PUSCH and a PUCCH in a subframe i of a cell c or a carrier c, a PUSCH transmit power is determined based on the following formula (2):

$$P_{PUSCH,c}(i) = \min\begin{cases} 10\log_{10}(\hat{P}_{CMAX,c}(i) - \hat{P}_{PUCCH,c}(i)) \\ 10\log_{10}(M_{PUSCH,c}(i)) + P_{O\_PUSCH,c} + \\ \alpha_c \cdot PL_c + \Delta_{TF,c}(i) + f_c(i) \end{cases} \text{[dBm]} \quad (2)$$

where meanings of $M_{PUSCH,c}(i)$ $P_{O\_PUSCH,c}$ $\alpha_c$, $PL_c$, $\Delta_{TF,c}(i)$, and $f_c(i)$ are the same as those described above, $\hat{P}_{CMAX,c}(i)$ is a linear value of $P_{CMAX,c}(i)$, where a meaning of $P_{CMAX,c}(i)$ is the same as that described above, and $\hat{P}_{PUCCH,c}(i)$ is a linear value of $P_{PUCCH,c}(i)$, where $P_{PUCCH,c}(i)$ is a PUCCH transmit power in the following descriptions.

(3) It is assumed that when the terminal device sends a PUCCH in a subframe i of a cell c or a carrier c, a PUCCH transmit power is determined based on the following formula (3):

$$P_{PUCCH,c}(i) = \min\begin{cases} P_{CMAX,c}(i) \\ P_{O\_PUCCH,c} + PL_c + h_c(n_{CQI}, n_{HARQ}, n_{SR}) + \\ \Delta_{F\_PUCCH,c}(F) + \Delta_{TxD,c}(F') + g_c(i) \end{cases} \text{[dBm]} \quad (3)$$

where meanings of $P_{CMAX,c}(i)$ and $PL_c$ are the same as those described above, $P_{O\_PUCCH,c}$ is a reference power value (that is, a receive power expected by the network device) configured by using higher layer signaling, where $P_{O\_PUCCH,c}=P_{O\_UE\_PUCCH,c}+P_{O\_NOMINAL\_PUCCH,c}$, $P_{O\_NOMINAL\_PUCCH,c}$ represents a PUCCH transmit power that is expected by the network device for normal demodulation and that is configured by using higher layer signaling, and $P_{O\_UE\_PUCCH,c}$ is a power offset, configured by using higher layer signaling, of the terminal device relative to $P_{O\_NOMINAL\_PUCCH,c}$, $h_c(n_{CQI}, n_{HARQ}, n_{SR})$ is a PUCCH transmit power offset configured based on a quantity of bits of CQI and an ACK that are carried, $\Delta_{F\_PUCCH,c}(F)$ is determined based on a relative relationship between a used PUCCH format and a PUCCH format 1a, $\Delta_{TxD,c}(F')$ is a transmit power offset configured by using higher layer signaling when the PUCCH is sent by using two antenna ports, and $g_c(i)$ is a closed-loop power control adjustment value of the terminal device, and is obtained through mapping by using TPC information in the PDCCH, where $g_c(i)$ is obtained by using a PUCCH power control algorithm, and power control includes a cumulative type and an absolute type. The cumulative type means adding a power adjustment value based on last $g_c(i)$, that is, $g_c(i)=g_c(i-1)+\sum_{m=0}^{M-1}\delta_{PUCCH,c}(i-k_m)$, where $\delta_{PUCCH,c}$ is a power adjustment value indicated by the TPC in the PDCCH, M=1 and $k_0=4$ for FDD, and M and $k_m$ are determined based on a TDD uplink-downlink configuration for TDD, and the absolute type means that a value of $g_c(i)$ is equal to a power adjustment value indicated by the TPC in the PDCCH.

(4) It is assumed that when the terminal device sends an SRS in a subframe i of a cell c or a carrier c, an SRS transmit power is determined based on the following formula (4):

$$P_{SRS,c}(i) = \min\begin{cases} P_{CMAX,c}(i) \\ P_{SRS\_OFFSET,c} + 10\log_{10}(M_{SRS,c}) + \\ P_{O\_PUSCH,c} + \alpha_c \cdot PL_c + f_c(i) \end{cases} \text{[dBm]} \quad (4)$$

where meanings of $P_{CMAX,c}(i)$, $P_{O\_PUSCH,c}$, $\alpha_c$, $PL_c$, and $f_c(i)$ are the same as those described above, $P_{SRS\_OFFSET,c}$ is a power offset value configured in a semi-static manner by using higher layer signaling, and $M_{SRS,c}$ is a quantity of RBs used for transmitting the SRS.

Usually, in a communications system in which carrier bandwidth is large bandwidth, a bandwidth capability of a terminal device may be less than the carrier bandwidth. For example, in a new radio (NR) technology of a 5G mobile communications system, maximum carrier bandwidth may be 400 MHz, and a bandwidth capability of a terminal device may be 20 MHz, 50 MHz, 100 MHz, or the like. In the 5G system, a network device configures a part of carrier bandwidth (referred to as a "carrier bandwidth part" below) in carrier bandwidth for the terminal device, and allocates some or all resources in the carrier bandwidth part to the terminal device, for communication between the network device and the terminal device. Bandwidth of the carrier bandwidth part is less than or equal to the bandwidth capability of the terminal device.

In some application scenarios (for example, a multi-numerology scenario or a bandwidth part fallback scenario), the network device determines that carrier bandwidth part switching needs to be performed for the terminal device. Because carrier bandwidth parts with different bandwidth sizes are corresponding to different frequency diversity gains, to ensure correct reception of uplink information, transmit powers used by the terminal device to send information on carrier bandwidth parts with different bandwidth sizes should also be different.

In the foregoing method, the network device configures a power control parameter for the terminal device in a configuration manner specific to a cell or a carrier (that is, a manner of performing independent configuration for different cells or carriers), that is, the terminal device uses a same power control parameter on all frequency resources in a cell or a carrier.

In a scenario in which a carrier bandwidth part is configured, configurations of different carrier bandwidth parts may be different. In this scenario, how to perform power control is a problem worth studying, to ensure correct reception of uplink information.

In a power control method and apparatus provided in the embodiments of this application, a network device configures a power control parameter for a terminal device in a configuration manner specific to a carrier bandwidth part (that is, a manner of performing independent configuration for different carrier bandwidth parts), so that the network device configures different power control parameters for the terminal device based on different carrier bandwidth parts, and the terminal device may send information on different carrier bandwidth parts by using different transmit powers, thereby ensuring uplink signal quality (or uplink coverage) during carrier bandwidth part switching.

A first carrier bandwidth part and a second carrier bandwidth part in the embodiments of this application may be located on a same carrier. Optionally, the first carrier bandwidth part and the second carrier bandwidth part may be alternatively located on different carriers. For example, in a scenario in which LTE and NR coexist, a first carrier bandwidth part is located on an NR dedicated uplink carrier or frequency, and a second carrier bandwidth part is located on a supplementary uplink (SUL) carrier or frequency. The dedicated uplink carrier and the supplementary uplink carrier may belong to a same cell.

By using specific embodiments, the following describes in detail technical solutions of this application and how to resolve the foregoing technical problems by using the technical solutions of this application. The following several specific embodiments may be combined with one another. Same or similar concepts or processes may not be described in detail in some embodiments.

Figure 2:
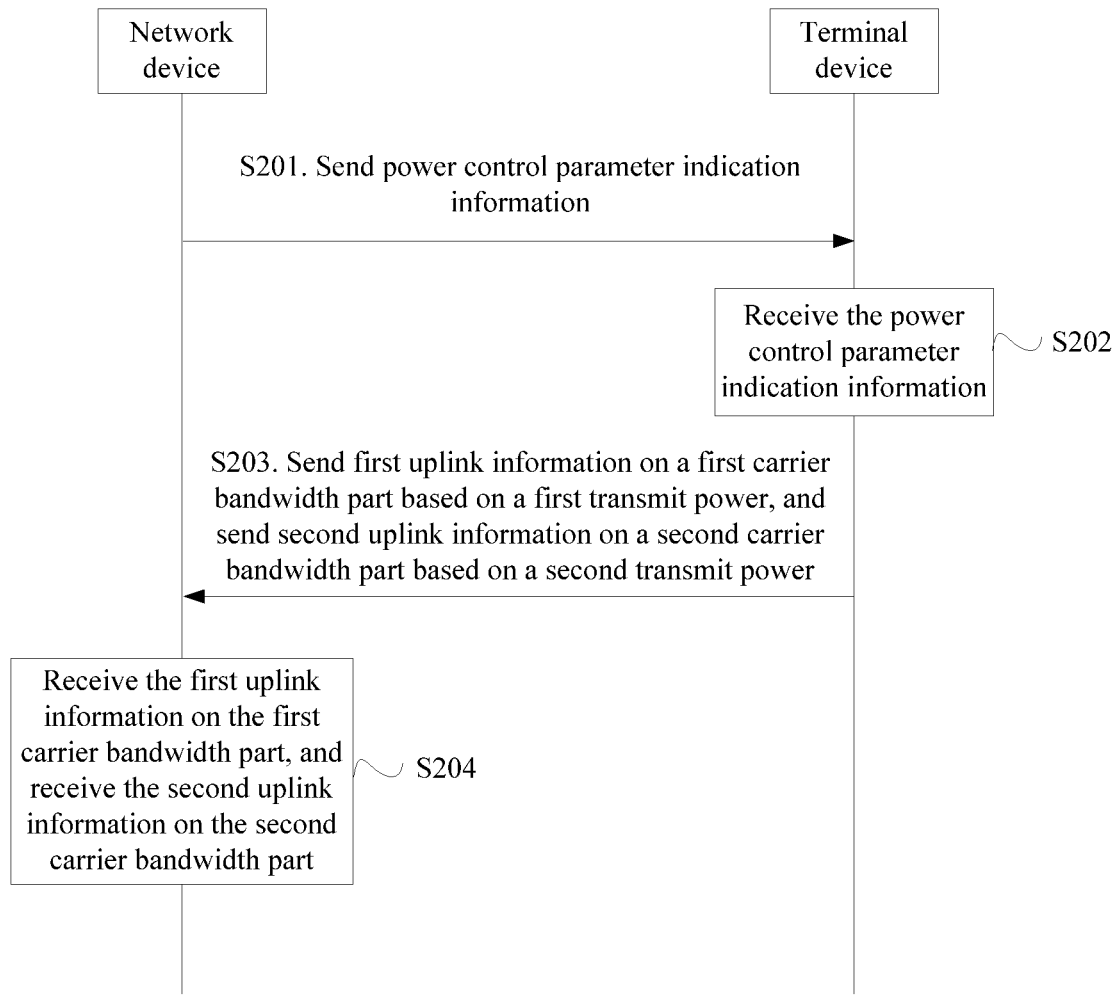
FIG. 2 is a schematic flowchart of a power control method according to an embodiment of this application.

FIG. 2 is a schematic flowchart of a power control method according to an embodiment of this application. As shown in FIG. 2, the method in the embodiments of this application may include the following steps.

Step S201: A network device sends power control parameter indication information.

Optionally, the power control parameter indication information is used to indicate a power control parameter corresponding to each of at least one carrier bandwidth part allocated by the network device to a terminal device.

For example, assuming that the network device allocates a carrier bandwidth part A to the terminal device on a carrier, the power control parameter indication information is used to indicate a power control parameter A corresponding to the carrier bandwidth part A (for example, the carrier bandwidth part A may be a first carrier bandwidth part in the embodiments of this application, and the corresponding power control parameter A may be a first power control parameter, or the carrier bandwidth part A may be a second carrier bandwidth part in the embodiments of this application, and the corresponding power control parameter A may be a second power control parameter).

For another example, assuming that the network device allocates a first carrier bandwidth part and a second carrier bandwidth part to the terminal device, the power control parameter indication information is used to indicate a first power control parameter corresponding to the first carrier bandwidth part and a second power control parameter corresponding to the second carrier bandwidth part.

For another example, assuming that the network device allocates a first carrier bandwidth part, a second carrier bandwidth part, and a third carrier bandwidth part to the terminal device, the power control parameter indication information is used to indicate at least one of a first power control parameter corresponding to the first carrier bandwidth part, a second power control parameter corresponding to the second carrier bandwidth part, and a third power control parameter corresponding to the third carrier bandwidth part. Optionally, the first carrier bandwidth part, the second carrier bandwidth part, and the third carrier bandwidth part may be located on a same carrier. Optionally, the first carrier bandwidth part, the second carrier bandwidth part, and the third carrier bandwidth part may be alternatively located on different carriers.

It should be noted that the network device may alternatively allocate any quantity of carrier bandwidth parts to the terminal device. This is not limited in the embodiments of this application. In addition, the power control parameter indication information may be alternatively used to indicate other information. This is not limited in the embodiments of this application either.

In the embodiments of this application, when the power control parameter indication information is used to indicate power control parameters corresponding to at least two carrier bandwidth parts, power control parameters that are corresponding to the at least two carrier bandwidth parts and that are indicated by the power control parameter indication information (for example, the first power control parameter corresponding to the first carrier bandwidth part, the second power control parameter corresponding to the second carrier bandwidth part, and the third power control parameter corresponding to the third carrier bandwidth part) may be the same or different. In this case, different power control parameters are configured for the terminal device based on different carrier bandwidth parts.

Optionally, the first power control parameter in the embodiments of this application may include a first open-loop power control parameter. For example, when the first carrier bandwidth part is used to send at least one of an SRS and data carried on a PUSCH, the first open-loop power control parameter may be a receive power $P_{O\_PUSCH,c,BWP1}$ expected by the network device, or the first open-loop power control parameter may include a PUSCH transmit power $P_{O\_NOMINAL\_PUSCH,c,BWP1}$ that is expected by the network device for normal demodulation and that is configured by using higher layer signaling, and a power offset $P_{O\_UE\_PUSCH,c,BWP1}$ configured by using higher layer signaling, of the terminal device relative to $P_{O\_NOMINAL\_PUSCH,c,BWP1}$. The subscript c,BWP1 is corresponding to the first carrier bandwidth part of a cell c or a carrier c. In some possible embodiments, the subscript c,BWP1 may be a subscript BWP1, corresponding to the first carrier bandwidth part. This is not limited in this application.

For another example, when the first carrier bandwidth part is used to send data carried on a PUCCH, the first open-loop power control parameter may be a receive power $P_{O\_PUCCH,c,BWP1}$ expected by the network device, or the first open-loop power control parameter may include a PUCCH transmit power $P_{O\_NOMINAL\_PUCCH,c,BWP1}$ that is expected by the network device for normal demodulation and that is configured by using higher layer signaling, and a power offset $P_{O\_UE\_PUCCH,c,BWP1}$, configured by using higher layer signaling, of the terminal device relative to $P_{O\_NOMINAL\_PUCCH,c,BWP1}$. The subscript c,BWP1 is corresponding to the first carrier bandwidth part of a cell c or a carrier c. In some possible embodiments, the subscript c,BWP1 may be a subscript BWP1, corresponding to the first carrier bandwidth part. This is not limited in this application.

Optionally, the first power control parameter in the embodiments of this application may include a first closed-loop power control parameter. For example, when the first carrier bandwidth part is used to send at least one of an SRS and data carried on a PUSCH, and power control is of an absolute type, the first closed-loop power control parameter may be a power adjustment value $\delta_{PUSCH,c,BWP1}$ indicated by TPC in a PDCCH, or when the first carrier bandwidth part is used to send at least one of an SRS and data carried on a PUSCH, and power control is of a cumulative type, the first closed-loop power control parameter may include a power adjustment value $\delta_{PUSCH,c,BWP1}$ indicated by TPC in a PDCCH, and optionally, the first closed-loop power control parameter may include an initial value $f_{c,BWP1}(0)$ of an adjustment value of a PUSCH transmit power and/or an SRS transmit power of the terminal device. The subscript c,BWP1 is corresponding to the first carrier bandwidth part of a cell c or a carrier c. In some possible embodiments, the subscript c,BWP1 may be a subscript BWP1, corresponding to the first carrier bandwidth part. This is not limited in this application.

For another example, when the first carrier bandwidth part is used to send data carried on a PUCCH, and power control is of an absolute type, the first closed-loop power control parameter may be a power adjustment value $\delta_{PUCCH,c,BWP1}$ indicated by TPC in a PDCCH, or when the first carrier bandwidth part is used to send data carried on a PUCCH, and power control is of a cumulative type, the first closed-loop power control parameter may include a power adjustment value $\delta_{PUCCH,c,BWP1}$ indicated by TPC in a PDCCH, and optionally, the first closed-loop power control parameter may include an initial value $g_{c,BWP1}(0)$ of an adjustment value of a PUCCH transmit power of the terminal device. The subscript c,BWP1 is corresponding to the first carrier bandwidth part of a cell c or a carrier c. In some possible embodiments, the subscript c,BWP1 may be a subscript BWP1, corresponding to the first carrier bandwidth part. This is not limited in this application.

Optionally, the first power control parameter in the embodiments of this application may include a first maximum transmit power parameter, for example, $P_{CMAX,c,BWP1}(i)$. The subscript c,BWP1 is corresponding to the first carrier bandwidth part of a cell c or a carrier c. In some possible embodiments, the subscript c,BWP1 may be a subscript BWP1, corresponding to the first carrier bandwidth part. This is not limited in this application.

Optionally, the first power control parameter in the embodiments of this application may include a first downlink path loss estimate $PL_{c,BWP1}$. The subscript c,BWP1 is corresponding to the first carrier bandwidth part of a cell c or a carrier c. In some possible embodiments, the subscript c,BWP1 may be a subscript BWP1, corresponding to the first carrier bandwidth part. This is not limited in this application.

Optionally, when the first carrier bandwidth part is used to send any one of an SRS and data carried on a PUSCH, the first power control parameter in the embodiments of this application may include a first path loss compensation factor $\alpha_{c,BWP1}$ configured by using higher layer signaling. The subscript c,BWP1 is corresponding to the first carrier bandwidth part of a cell c or a carrier c. In some possible embodiments, the subscript c,BWP1 may be a subscript BWP1, corresponding to the first carrier bandwidth part. This is not limited in this application.

Optionally, when the first carrier bandwidth part is used to send an SRS, the first power control parameter in the embodiments of this application may include a power offset value $P_{SRS\_OFFSET,c,BWP1}$ configured by using higher layer signaling. The subscript c,BWP1 is corresponding to the first carrier bandwidth part of a cell c or a carrier c. In some possible embodiments, the subscript c,BWP1 may be a subscript BWP1, corresponding to the first carrier bandwidth part. This is not limited in this application.

Optionally, when the first carrier bandwidth part is used to send data carried on a PUCCH, the first power control parameter in the embodiments of this application may include a first PUCCH format related power control parameter, including a power control parameter $\Delta_{F\_PUCCH,c,BWP1}(F)$ determined based on a relative relationship between a used PUCCH format and a PUCCH format 1a, and/or a transmit power offset $\Delta_{TxD,c,BWP1}(F')$ configured by using higher layer signaling. The subscript c,BWP1 is corresponding to the first carrier bandwidth part of a cell c or a carrier c. In some possible embodiments, the subscript c,BWP1 may be a subscript BWP1, corresponding to the first carrier bandwidth part. This is not limited in this application.

Optionally, when the first carrier bandwidth part is used to send data carried on a PUSCH, the first power control parameter may include a combination of at least any two of the first open-loop power control parameter, the first closed-loop power control parameter, the first maximum transmit power parameter, the first downlink path loss estimate, and the first path loss compensation factor. Certainly, the first power control parameter may further include another parameter. This is not limited in the embodiments of this application.

Optionally, when the first carrier bandwidth part is used to send an SRS, the first power control parameter may include a combination of at least any two of the first open-loop power control parameter, the first closed-loop power control parameter, the first maximum transmit power parameter, the first downlink path loss estimate, and the first path loss compensation factor. Certainly, the first power control parameter may further include other parameters. This is not limited in the embodiments of this application.

Optionally, when the first carrier bandwidth part is used to send data carried on a PUCCH, the first power control parameter may include a combination of at least any two of the first open-loop power control parameter, the first closed-loop power control parameter, the first maximum transmit power parameter, the first downlink path loss estimate, and the first PUCCH format related power control parameter. Certainly, the first power control parameter may further include other parameters. This is not limited in the embodiments of this application.

It may be understood that if the power control parameter indication information is used to indicate power control parameters corresponding to at least two carrier bandwidth parts, for an implementation of a power control parameter corresponding to each of the carrier bandwidth parts (for example, the second power control parameter corresponding to the second carrier bandwidth part), refer to the implementations of the first power control parameter (it should be noted that the subscript c,BWP1 of the identifiers corresponding to the first power control parameter is modified into c,BWP2 or BWP2, corresponding to the second carrier bandwidth part). Details are not described herein again.

Optionally, for cumulative-type power adjustment of closed-loop power control, an adjustment value of a PUSCH transmit power and/or an SRS transmit power of the terminal device is independently calculated on each carrier bandwidth part. When an uplink carrier bandwidth part is switched, the adjustment value of the transmit power is reset.

Optionally, the power control parameter indication information may indicate, in at least the following several implementations, the first power control parameter corresponding to the first carrier bandwidth part allocated by the network device to the terminal device on the carrier.

In a first implementation, the power control parameter indication information includes the first power control parameter. The first power control parameter is used to indicate a first transmit power for transmitting data on the first carrier bandwidth part.

Optionally, for an implementation of the first power control parameter, refer to the foregoing related content. Details are not described herein again.

In a second implementation, the power control parameter indication information includes a reference power control parameter. The reference power control parameter may include at least one power control parameter corresponding to a reference carrier bandwidth part, or the reference power control parameter may include at least one power control parameter corresponding to a reference transmission parameter. Optionally, the reference carrier bandwidth part may be at least one of the following: bandwidth of the reference carrier bandwidth part, a subcarrier spacing of the reference carrier bandwidth part, and a CP type of the reference carrier bandwidth part. Certainly, the reference carrier bandwidth part may be alternatively another parameter. This is not limited in the embodiments of this application. Optionally, the reference transmission parameter may include at least one of the following: reference bandwidth, a reference subcarrier spacing, and a reference CP type. Certainly, the reference transmission parameter may alternatively include other transmission parameters. This is not limited in the embodiments of this application. Optionally, the reference carrier bandwidth part or the reference transmission parameter may be predefined, or may be configured by the network device.

Certainly, the power control parameter indication information may alternatively indicate, in other implementations, the first power control parameter corresponding to the first carrier bandwidth part allocated by the network device to the terminal device. This is not limited in the embodiments of this application.

Optionally, when the power control parameter indication information is used to indicate power control parameters corresponding to at least two carrier bandwidth parts allocated by the network device to the terminal device, for a manner of indicating, by the power control parameter indication information, a power control parameter corresponding to a carrier bandwidth part, other than the first carrier bandwidth part (for example, the second power control parameter corresponding to the second carrier bandwidth part), allocated by the network device to the terminal device, refer to the configuration manner of indicating, by the power control parameter indication information, the first power control parameter corresponding to the first carrier bandwidth part allocated by the network device to the terminal device. Details are not described herein again.

It should be noted that the configuration manner of the first power control parameter corresponding to the first carrier bandwidth part and the configuration manner of the second power control parameter corresponding to the second carrier bandwidth part may be the same or different. For example, the configuration manner of the first power control parameter corresponding to the first carrier bandwidth part may be the foregoing first implementation, but the configuration manner of the second power control parameter corresponding to the second carrier bandwidth part may be the foregoing second implementation. Alternatively, the configuration manner of the first power control parameter corresponding to the first carrier bandwidth part may be the foregoing second implementation, but the configuration manner of the second power control parameter corresponding to the second carrier bandwidth part may be the foregoing first implementation. Alternatively, both the configuration manner of the first power control parameter corresponding to the first carrier bandwidth part and the configuration manner of the second power control parameter corresponding to the second carrier bandwidth part may be the foregoing first implementation or the foregoing second implementation.

Optionally, when the network device allocates a plurality of carrier bandwidth parts to the terminal device, for a configuration manner of a power control parameter corresponding to at least one of the plurality of carrier bandwidth parts, refer to the configuration manner of indicating, by the power control parameter indication information, the first power control parameter corresponding to the first carrier bandwidth part allocated by the network device to the terminal device. However, for a configuration manner of a power control parameter corresponding to a carrier bandwidth part, other than the at least one carrier bandwidth part, in the plurality of carrier bandwidth parts, refer to the cell-specific or carrier-specific configuration manner in the foregoing method. Details are not described herein again. For example, the configuration manner of the first power control parameter corresponding to the first carrier bandwidth part may be the foregoing first or second implementation, for the configuration manner of the second power control parameter corresponding to the second carrier bandwidth part, refer to the cell-specific or carrier-specific configuration manner in the foregoing method. Alternatively, the configuration manner of the second power control parameter corresponding to the second carrier bandwidth part may be the foregoing first or second implementation, for the configuration manner of the first power control parameter corresponding to the first carrier bandwidth part, refer to the cell-specific or carrier-specific configuration manner in the foregoing method.

Step S202: Receive the power control parameter indication information.

In this step, the terminal device receives the power control parameter indication information (used to indicate the power control parameter corresponding to each of the at least one carrier bandwidth part allocated by the network device to the terminal device) sent by the network device, determines, based on the power control parameter indication information, the power control parameter corresponding to the at least one carrier bandwidth part, and further determines, based on the power control parameter corresponding to each of the at least one carrier bandwidth part, a corresponding transmit power for transmitting data on each carrier bandwidth part.

For example, if the power control parameter indication information is used to indicate the power control parameter A corresponding to a carrier bandwidth part A, the terminal device determines, based on the power control parameter indication information, the power control parameter A corresponding to the carrier bandwidth part A, and determines, based on the power control parameter A, a corresponding transmit power for transmitting data on the carrier bandwidth part A. For example, the carrier bandwidth part A may be the first carrier bandwidth part in the embodiments of this application, the corresponding power control parameter A may be the first power control parameter, and the corresponding transmit power may be the first transmit power, or the carrier bandwidth part A may be the second carrier bandwidth part in the embodiments of this application, the corresponding power control parameter A may be the second power control parameter, and the corresponding transmit power may be a second transmit power.

For another example, if the power control parameter indication information is used to indicate the first power control parameter corresponding to the first carrier bandwidth part and the second power control parameter corresponding to the second carrier bandwidth part, the terminal device determines, based on the power control parameter indication information, the first power control parameter corresponding to the first carrier bandwidth part and the second power control parameter corresponding to the second carrier bandwidth part, and further determines, based on the first power control parameter, the corresponding first transmit power for transmitting data on the first carrier bandwidth part, and determines, based on the second power control parameter, the corresponding second transmit power for transmitting data on the second carrier bandwidth part.

Certainly, the power control parameter indication information may be alternatively used to indicate power control parameters corresponding to another quantity of carrier bandwidth parts. Correspondingly, the terminal device determines, based on the power control parameter indication information, the power control parameter corresponding to each of the carrier bandwidth parts, and further determines corresponding transmit power for transmitting data on each of the carrier bandwidth parts.

First, manners of determining, by the terminal device based on the power control parameter indication information, the power control parameter corresponding to the at least one carrier bandwidth part are described in detail.

The following part is described by using an example in which the terminal device determines, based on the power control parameter indication information (used to indicate the first power control parameter corresponding to the first carrier bandwidth part), the first power control parameter corresponding to the first carrier bandwidth part.

Optionally, the terminal device may determine, based on the power control parameter indication information in at least the following several implementations, the first power control parameter corresponding to the first carrier bandwidth part.

In a first implementation, if the power control parameter indication information includes the first power control parameter (used to indicate the first transmit power for transmitting data on the first carrier bandwidth part), the terminal device directly determines, based on the power control parameter indication information, the first power control parameter corresponding to the first carrier bandwidth part.

Optionally, for an implementation of the first power control parameter, refer to the related content in step S201. Details are not described herein again.

In a second implementation, if the power control parameter indication information includes the reference power control parameter, and the reference power control parameter may include at least one power control parameter corresponding to the reference carrier bandwidth part, the terminal device determines the first power control parameter corresponding to the first carrier bandwidth part based on the reference power control parameter, the reference carrier bandwidth part, and the first carrier bandwidth part.

Optionally, the determining, by the terminal device, the first power control parameter corresponding to the first carrier bandwidth part based on the reference power control parameter, the reference carrier bandwidth part, and the first carrier bandwidth part may include: determining, by the terminal device, the first power control parameter corresponding to the first carrier bandwidth part based on the reference power control parameter, a transmission parameter of the reference carrier bandwidth part, and a transmission parameter of the first carrier bandwidth part.

Optionally, the transmission parameter of the reference carrier bandwidth part may include the bandwidth of the reference carrier bandwidth part (for example, a quantity of RBs included in the reference carrier bandwidth part), and the transmission parameter of the first carrier bandwidth part may include bandwidth of the first carrier bandwidth part (for example, a quantity of RBs included in the first carrier bandwidth part). Optionally, the transmission parameter of the reference carrier bandwidth part may include the subcarrier spacing of the reference carrier bandwidth part, and the transmission parameter of the first carrier bandwidth part may include a subcarrier spacing of the first carrier bandwidth part. Optionally, the transmission parameter of the reference carrier bandwidth part may include the CP type of the reference carrier bandwidth part, and the transmission parameter of the first carrier bandwidth part may include a CP type of the first carrier bandwidth part.

Optionally, the reference carrier bandwidth part may be an uplink carrier bandwidth part, or may be a downlink carrier bandwidth part. This is not limited in the embodiments of this application.

Optionally, the transmission parameter of the reference carrier bandwidth part in the foregoing embodiment may include a combination of at least any two of the bandwidth of the reference carrier bandwidth part, the subcarrier spacing of the reference carrier bandwidth part, and the CP type of the reference carrier bandwidth part. Correspondingly, the transmission parameter of the first carrier bandwidth part may also include a combination of at least two of the bandwidth of the first carrier bandwidth part, the subcarrier spacing of the first carrier bandwidth part, and the CP type of the first carrier bandwidth part. For example, if the transmission parameter of the reference carrier bandwidth part may include the bandwidth of the reference carrier bandwidth part and the subcarrier spacing of the reference carrier bandwidth part, the transmission parameter of the first carrier bandwidth part may also include the bandwidth of the first carrier bandwidth part and the subcarrier spacing of the first carrier bandwidth part. For another example, if the transmission parameter of the reference carrier bandwidth part may include the bandwidth of the reference carrier bandwidth part and the CP type of the reference carrier bandwidth part, the transmission parameter of the first carrier bandwidth part may also include the bandwidth of the first carrier bandwidth part and the cyclic prefix type of the first carrier bandwidth part. For another example, if the transmission parameter of the reference carrier bandwidth part may include the subcarrier spacing of the reference carrier bandwidth part and the CP type of the reference carrier bandwidth part, the transmission parameter of the first carrier bandwidth part may also include the subcarrier spacing of the first carrier bandwidth part and the CP type of the first carrier bandwidth part. For another example, if the transmission parameter of the reference carrier bandwidth part may include the bandwidth of the reference carrier bandwidth part, the subcarrier spacing of the reference carrier bandwidth part, and the CP type of the reference carrier bandwidth part, the transmission parameter of the first carrier bandwidth part may also include the bandwidth of the first carrier bandwidth part, the subcarrier spacing of the first carrier bandwidth part, and the CP type of the first carrier bandwidth part.

It should be noted that if the transmission parameter of the reference carrier bandwidth part includes another type of transmission parameter, the transmission parameter of the first carrier bandwidth part may also include a corresponding transmission parameter. This is not limited in the embodiments of this application.

Optionally, the first power control parameter may include the foregoing first open-loop power control parameter, and the reference power control parameter in the foregoing embodiment may include a reference open-loop power control parameter. For example, when the first carrier bandwidth part is used to send at least one of the SRS and the data carried on the PUSCH, the reference open-loop power control parameter may be a reference receive power $P_{O\_PUSCH}$ expected by the network device, or the reference open-loop power control parameter may be a PUSCH reference transmit power $P_{O\_NOMINAL\_PUSCH}$ that is expected by the network device for normal demodulation and that is configured by using higher layer signaling, and/or a reference power offset $P_{O\_UE\_PUSCH}$, configured by using higher layer signaling, of the terminal device relative to $P_{O\_NOMINAL\_PUSCH}$. For another example, when the first carrier bandwidth part is used to send the data carried on the PUCCH, the reference open-loop power control parameter may be a reference receive power $P_{O\_PUCCH}$ expected by the network device, or the reference open-loop power control parameter may be a PUCCH reference transmit power $P_{O\_NOMINAL\_PUCCH}$ that is expected by the network device for normal demodulation and that is configured by using higher layer signaling, and/or a reference power offset $P_{O\_UE\_PUCCH}$, configured by using higher layer signaling, of the terminal device relative to $P_{O\_NOMINAL\_PUCCH}$.

Optionally, the first power control parameter may include the foregoing first closed-loop power control parameter, and the reference power control parameter in the foregoing embodiment may include a reference closed-loop power control parameter. For example, when the first carrier bandwidth part is used to send at least one of the SRS and the data carried on the PUSCH, the reference closed-loop power control parameter may be a reference adjustment value f of the PUSCH transmit power of the terminal device, or the reference closed-loop power control parameter may be a reference power adjustment value $\delta_{PUSCH}$ indicated by the TPC in the PDCCH, and/or a reference initial value f(0) of the adjustment value of the PUSCH transmit power and/or the SRS transmit power of the terminal device. For another example, when the first carrier bandwidth part is used to send the data carried on the PUCCH, the reference closed-loop power control parameter may be a reference adjustment value g for closed-loop power control of the terminal device, or the reference closed-loop power control parameter may be a reference power adjustment value $\delta_{PUCCH}$ indicated by the TPC in the PDCCH, and/or a reference initial value g(0) of the adjustment value of the PUCCH transmit power of the terminal device.

Optionally, the first power control parameter may include the foregoing first maximum transmit power parameter, and the reference power control parameter in the foregoing embodiment may include a reference maximum transmit power parameter, for example, $P_{CMAX}$.

Optionally, the first power control parameter may include the foregoing first downlink path loss estimate, and the reference power control parameter in the foregoing embodiment may include a reference downlink path loss estimate, for example, PL (used to indicate a reference downlink path loss estimate that is estimated by the terminal device).

Optionally, when the first carrier bandwidth part is used to send at least one of the SRS and the data carried on the PUSCH, the first power control parameter may include the foregoing first path loss compensation factor, and the reference power control parameter in the foregoing embodiment may include a reference path loss compensation factor, for example, a (used to indicate a reference path loss compensation factor configured by using higher layer signaling).

Optionally, when the first carrier bandwidth part is used to send the data carried on the PUCCH, the first power control parameter may include the foregoing first PUCCH format related power control parameter, and the reference power control parameter in the foregoing embodiment may include a reference PUCCH format related power control parameter. For example, if the first PUCCH format related power control parameter is $\Delta_{F\_PUCCH,c,BWP1}(F)$, the reference PUCCH format related power control parameter may be a reference power control parameter $\Delta_{F\_PUCCH}(F)$ determined based on the relative relationship between the used PUCCH format and the PUCCH format 1a, if the first PUCCH format related power control parameter is $\Delta_{TxD,c,BWP1}(F')$, the reference PUCCH format related power control parameter may be a reference transmit power offset $\Delta_{TxD}(F')$ configured by using higher layer signaling, or if the first PUCCH format related power control parameter includes $\Delta_{F\_PUCCH,c,BWP1}(F)$ and $\Delta_{TxD,c,BWP1}(F')$, the reference PUCCH format related power control parameter may include $\Delta_{F\_PUCCH}(F)$ and $\Delta_{TxD}(F')$.

Optionally, when the first carrier bandwidth part is used to send the data carried on the PUSCH, the first power control parameter may include a combination of at least any two of the first open-loop power control parameter, the first closed-loop power control parameter, the first maximum transmit power parameter, the first downlink path loss estimate, and the first path loss compensation factor, and the reference power control parameter in the foregoing embodiment may correspondingly include a combination of at least any two of the reference open-loop power control parameter, the reference closed-loop power control parameter, the reference maximum transmit power parameter, the reference downlink path loss estimate, and the reference path loss compensation factor.

Optionally, when the first carrier bandwidth part is used to send the SRS, the first power control parameter may include a combination of at least any two of the first open-loop power control parameter, the first closed-loop power control parameter, the first maximum transmit power parameter, the first downlink path loss estimate, and the first path loss compensation factor, and the reference power control parameter in the foregoing embodiment may correspondingly include a combination of at least any two of the reference open-loop power control parameter, the reference closed-loop power control parameter, the reference maximum transmit power parameter, the reference downlink path loss estimate, and the reference path loss compensation factor.

Optionally, when the first carrier bandwidth part is used to send the data carried on the PUCCH, the first power control parameter may include a combination of at least any two of the first open-loop power control parameter, the first closed-loop power control parameter, the first maximum transmit power parameter, the first downlink path loss estimate, and the first PUCCH format related power control parameter, and the reference power control parameter in the foregoing embodiment may correspondingly include a combination of at least any two of the reference open-loop power control parameter, the reference closed-loop power control parameter, the reference maximum transmit power parameter, the reference downlink path loss estimate, and the reference PUCCH format related power control parameter.

It should be noted that if the first power control parameter includes another type of power control parameter, the reference power control parameter in the foregoing embodiment may also include a corresponding power control parameter. This is not limited in the embodiments of this application.

Optionally, the terminal device determines the first power control parameter corresponding to the first carrier bandwidth part based on the reference power control parameter, the transmission parameter of the reference carrier bandwidth part, the transmission parameter of the first carrier bandwidth part, and first mapping information. The first mapping information includes a mapping relationship between the transmission parameter of the reference carrier bandwidth part, the transmission parameter of the first carrier bandwidth part, and a compensation offset corresponding to at least one power control parameter included in the reference power control parameter. Optionally, the first mapping information may be predefined, or may be configured by the network device. Optionally, the first power control parameter is determined based on the reference power control parameter plus the compensation offset.

For example, when the first carrier bandwidth part is used to send at least one of the SRS and the data carried on the PUSCH, and the bandwidth of the first carrier bandwidth part is equal to the bandwidth of the reference carrier bandwidth, a value of a compensation offset corresponding to the reference open-loop power control parameter is 0, when the first carrier bandwidth part is used to send at least one of the SRS and the data carried on the PUSCH, and the bandwidth of the first carrier bandwidth part is less than the bandwidth of the reference carrier bandwidth part, a value of a compensation offset corresponding to the reference open-loop power control parameter is a positive number, where the compensation offset may be determined based on a ratio or a difference between the bandwidth of the reference carrier bandwidth part and the bandwidth of the first carrier bandwidth part, or when the first carrier bandwidth part is used to send at least one of the SRS and the data carried on the PUSCH, and the bandwidth of the first carrier bandwidth part is greater than the bandwidth of the reference carrier bandwidth part, a value of a compensation offset corresponding to the reference open-loop power control parameter is a negative number, where the compensation offset may be determined based on a ratio or a difference between the bandwidth of the reference carrier bandwidth part and the bandwidth of the first carrier bandwidth part, or the value of the compensation offset is 0.

For example, when the first carrier bandwidth part is used to send at least one of the SRS and the data carried on the PUSCH, and the subcarrier spacing of the first carrier bandwidth part is equal to the subcarrier spacing of the reference carrier bandwidth, a value of a compensation offset corresponding to the reference open-loop power control parameter is 0, when the first carrier bandwidth part is used to send at least one of the SRS and the data carried on the PUSCH, and the subcarrier spacing of the first carrier bandwidth part is less than the subcarrier spacing of the reference carrier bandwidth part, a value of a compensation offset corresponding to the reference open-loop power control parameter is a negative number, where the compensation offset may be determined based on a ratio or a difference between the subcarrier spacing of the reference carrier bandwidth part and the subcarrier spacing of the first carrier bandwidth part, or the value of the compensation offset is 0, or when the first carrier bandwidth part is used to send at least one of the SRS and the data carried on the PUSCH, and the subcarrier spacing of the first carrier bandwidth part is greater than the subcarrier spacing of the reference carrier bandwidth part, a value of a compensation offset corresponding to the reference open-loop power control parameter is a positive number, where the compensation offset may be determined based on a ratio or a difference between the subcarrier spacing of the reference carrier bandwidth part and the subcarrier spacing of the first carrier bandwidth part.

For example, when the first carrier bandwidth part is used to send at least one of the SRS and the data carried on the PUSCH, and the bandwidth of the first carrier bandwidth part is equal to the bandwidth of the reference carrier bandwidth, a value of a compensation offset corresponding to the reference closed-loop power control parameter is 0, when the first carrier bandwidth part is used to send at least one of the SRS and the data carried on the PUSCH, and the bandwidth of the first carrier bandwidth part is less than the bandwidth of the reference carrier bandwidth, a value of a compensation offset corresponding to the reference closed-loop power control parameter is a positive number, where the compensation offset may be determined based on a ratio or a difference between the bandwidth of the reference carrier bandwidth part and the bandwidth of the first carrier bandwidth part, or when the first carrier bandwidth part is used to send at least one of the SRS and the data carried on the PUSCH, and the bandwidth of the first carrier bandwidth part is greater than the bandwidth of the reference carrier bandwidth, a value of a compensation offset corresponding to the reference closed-loop power control parameter is a negative number, where the compensation offset may be determined based on a ratio or a difference between the bandwidth of the reference carrier bandwidth part and the bandwidth of the first carrier bandwidth part, or the value of the compensation offset is 0.

For example, when the first carrier bandwidth part is used to send at least one of the SRS and the data carried on the PUSCH, and the subcarrier spacing of the first carrier bandwidth part is equal to the subcarrier spacing of the reference carrier bandwidth, a value of a compensation offset corresponding to the reference closed-loop power control parameter is 0, when the first carrier bandwidth part is used to send at least one of the SRS and the data carried on the PUSCH, and the subcarrier spacing of the first carrier bandwidth part is less than the subcarrier spacing of the reference carrier bandwidth, a value of a compensation offset corresponding to the reference closed-loop power control parameter is a negative number, where the compensation offset may be determined based on a ratio or a difference between the subcarrier spacing of the reference carrier bandwidth part and the subcarrier spacing of the first carrier bandwidth part, or the value of the compensation offset is 0, or when the first carrier bandwidth part is used to send at least one of the SRS and the data carried on the PUSCH, and the subcarrier spacing of the first carrier bandwidth part is greater than the subcarrier spacing of the reference carrier bandwidth, a value of a compensation offset corresponding to the reference closed-loop power control parameter is a positive number, where the compensation offset may be determined based on a ratio or a difference between the subcarrier spacing of the reference carrier bandwidth part and the subcarrier spacing of the first carrier bandwidth part.

For example, when the bandwidth of the first carrier bandwidth part is equal to the bandwidth of the reference carrier bandwidth, a value of a compensation offset corresponding to the reference downlink path loss estimate is 0, when the bandwidth of the first carrier bandwidth part is less than the bandwidth of the reference carrier bandwidth, a value of a compensation offset corresponding to the reference downlink path loss estimate is a positive number, where the compensation offset may be determined based on a ratio between the bandwidth of the reference carrier bandwidth part and the bandwidth of the first carrier bandwidth part, or when the bandwidth of the first carrier bandwidth part is greater than the bandwidth of the reference carrier bandwidth, a value of a compensation offset corresponding to the reference downlink path loss estimate is a negative number, where the compensation offset may be determined based on a ratio between the bandwidth of the reference carrier bandwidth part and the bandwidth of the first carrier bandwidth part, or the value of the compensation offset is 0.

For example, when the subcarrier spacing of the first carrier bandwidth part is equal to the subcarrier spacing of the reference carrier bandwidth, a value of a compensation offset corresponding to the reference downlink path loss estimate is 0, when the subcarrier spacing of the first carrier bandwidth part is less than the subcarrier spacing of the reference carrier bandwidth, a value of a compensation offset corresponding to the reference downlink path loss estimate is a negative number, where the compensation offset may be determined based on a ratio or a difference between the subcarrier spacing of the reference carrier bandwidth part and the subcarrier spacing of the first carrier bandwidth part, or the value of the compensation offset is 0, or when the subcarrier spacing of the first carrier bandwidth part is greater than the subcarrier spacing of the reference carrier bandwidth, a value of a compensation offset corresponding to the reference downlink path loss estimate is a positive number, where the compensation offset may be determined based on a ratio or a difference between the subcarrier spacing of the reference carrier bandwidth part and the subcarrier spacing of the first carrier bandwidth part.

It should be noted that when the transmission parameter of the first carrier bandwidth part includes another transmission parameter, and the transmission parameter of the reference carrier bandwidth includes a corresponding transmission parameter, for a compensation offset corresponding to any power control parameter included in the reference power control parameter, refer to the compensation offset corresponding to the reference open-loop power control parameter, the compensation offset corresponding to the reference closed-loop power control parameter, or the compensation offset corresponding to the reference downlink path loss estimate. Examples are not described one by one herein.

Optionally, the terminal device determines the first power control parameter corresponding to the first carrier bandwidth part based on the reference power control parameter, the transmission parameter of the reference carrier bandwidth part, the transmission parameter of the first carrier bandwidth part, and second mapping information. The second mapping information includes a mapping relationship between the transmission parameter of the reference carrier bandwidth part, the transmission parameter of the first carrier bandwidth part, and a compensation coefficient corresponding to at least one power control parameter included in the reference power control parameter. Optionally, the second mapping information may be predefined, or may be configured by the network device. Optionally, the first power control parameter is determined based on the reference power control parameter multiplied by the compensation coefficient.

For example, when the first carrier bandwidth part is used to send at least one of the SRS and the data carried on the PUSCH, and the bandwidth of the first carrier bandwidth part is equal to the bandwidth of the reference carrier bandwidth, a value of a compensation coefficient corresponding to the reference open-loop power control parameter is 1, when the first carrier bandwidth part is used to send at least one of the SRS and the data carried on the PUSCH, and the bandwidth of the first carrier bandwidth part is less than the bandwidth of the reference carrier bandwidth part, a value of a compensation coefficient corresponding to the reference open-loop power control parameter is greater than 1, where the compensation coefficient may be determined based on a ratio or a difference between the bandwidth of the reference carrier bandwidth part and the bandwidth of the first carrier bandwidth part, or when the first carrier bandwidth part is used to send at least one of the SRS and the data carried on the PUSCH, and the bandwidth of the first carrier bandwidth part is greater than the bandwidth of the reference carrier bandwidth part, a value of a compensation coefficient corresponding to the reference open-loop power control parameter is less than 1, where the compensation coefficient may be determined based on a ratio or a difference between the bandwidth of the reference carrier bandwidth part and the bandwidth of the first carrier bandwidth part, or the value of the compensation coefficient is 1.

For example, when the first carrier bandwidth part is used to send at least one of the SRS and the data carried on the PUSCH, and the subcarrier spacing of the first carrier bandwidth part is equal to the subcarrier spacing of the reference carrier bandwidth part, a value of a compensation coefficient corresponding to the reference open-loop power control parameter is 1, when the first carrier bandwidth part is used to send at least one of the SRS and the data carried on the PUSCH, and the subcarrier spacing of the first carrier bandwidth part is smaller than the subcarrier spacing of the reference carrier bandwidth part, a value of a compensation coefficient corresponding to the reference open-loop power control parameter is less than 1, where the compensation coefficient may be determined based on a ratio or a difference between the subcarrier spacing of the reference carrier bandwidth part and the subcarrier spacing of the first carrier bandwidth part, or the value of the compensation coefficient is 1, or when the first carrier bandwidth part is used to send at least one of the SRS and the data carried on the PUSCH, and the subcarrier spacing of the first carrier bandwidth part is greater than the subcarrier spacing of the reference carrier bandwidth part, a value of a compensation coefficient corresponding to the reference open-loop power control parameter is greater than 1, where the compensation coefficient may be determined based on a ratio or a difference between the subcarrier spacing of the reference carrier bandwidth part and the subcarrier spacing of the first carrier bandwidth part.

For example, when the first carrier bandwidth part is used to send at least one of the SRS and the data carried on the PUSCH, and the bandwidth of the first carrier bandwidth part is equal to the bandwidth of the reference carrier bandwidth, a value of a compensation coefficient corresponding to the reference closed-loop power control parameter is 1, when the first carrier bandwidth part is used to send at least one of the SRS and the data carried on the PUSCH, and the bandwidth of the first carrier bandwidth part is less than the bandwidth of the reference carrier bandwidth, a value of a compensation coefficient corresponding to the reference closed-loop power control parameter is greater than 1, where the compensation coefficient may be determined based on a ratio between the bandwidth of the reference carrier bandwidth part and the bandwidth of the first carrier bandwidth part, or when the first carrier bandwidth part is used to send at least one of the SRS and the data carried on the PUSCH, and the bandwidth of the first carrier bandwidth part is greater than the bandwidth of the reference carrier bandwidth, a value of a compensation coefficient corresponding to the reference closed-loop power control parameter is less than 1, where the compensation coefficient may be determined based on a ratio between the bandwidth of the reference carrier bandwidth part and the bandwidth of the first carrier bandwidth part, or the value of the compensation coefficient is 1.

For example, when the first carrier bandwidth part is used to send at least one of the SRS and the data carried on the PUSCH, and the subcarrier spacing of the first carrier bandwidth part is equal to the subcarrier spacing of the reference carrier bandwidth part, a value of a compensation coefficient corresponding to the reference closed-loop power control parameter is 1, when the first carrier bandwidth part is used to send at least one of the SRS and the data carried on the PUSCH, and the subcarrier spacing of the first carrier bandwidth part is less than the subcarrier spacing of the reference carrier bandwidth part, a value of a compensation coefficient corresponding to the reference closed-loop power control parameter is less than 1, where the compensation coefficient may be determined based on a ratio or a difference between the subcarrier spacing of the reference carrier bandwidth part and the subcarrier spacing of the first carrier bandwidth part, or the value of the compensation coefficient is 1, or when the first carrier bandwidth part is used to send at least one of the SRS and the data carried on the PUSCH, and the subcarrier spacing of the first carrier bandwidth part is greater than the subcarrier spacing of the reference carrier bandwidth part, a value of a compensation coefficient corresponding to the reference closed-loop power control parameter is greater than 1, where the compensation coefficient may be determined based on a ratio or a difference between the subcarrier spacing of the reference carrier bandwidth part and the subcarrier spacing of the first carrier bandwidth part.

For example, when the bandwidth of the first carrier bandwidth part is equal to the bandwidth of the reference carrier bandwidth, a value of a compensation coefficient corresponding to the reference downlink path loss estimate is 1, when the bandwidth of the first carrier bandwidth part is less than the bandwidth of the reference carrier bandwidth part, a value of a compensation coefficient corresponding to the reference downlink path loss estimate is greater than 1, where the compensation coefficient may be determined based on a ratio between the bandwidth of the reference carrier bandwidth part and the bandwidth of the first carrier bandwidth part, or when the bandwidth of the first carrier bandwidth part is greater than the bandwidth of the reference carrier bandwidth part, a value of a compensation coefficient corresponding to the reference downlink path loss estimate is less than 1, where the compensation coefficient may be determined based on a ratio between the bandwidth of the reference carrier bandwidth part and the bandwidth of the first carrier bandwidth part, or the value of the compensation coefficient is 1.

For example, when the subcarrier spacing of the first carrier bandwidth part is equal to the subcarrier spacing of the reference carrier bandwidth part, a value of a compensation coefficient corresponding to the reference downlink path loss estimate is 1, when the subcarrier spacing of the first carrier bandwidth part is less than the subcarrier spacing of the reference carrier bandwidth part, a value of a compensation coefficient corresponding to the reference downlink path loss estimate is less than 1, where the compensation coefficient may be determined based on a ratio or a difference between the subcarrier spacing of the reference carrier bandwidth part and the subcarrier spacing of the first carrier bandwidth part, or the value of the compensation coefficient is 1, or when the subcarrier spacing of the first carrier bandwidth part is greater than the subcarrier spacing of the reference carrier bandwidth part, a value of a compensation coefficient corresponding to the reference downlink path loss estimate is greater than 1, where the compensation coefficient may be determined based on a ratio or a difference between the subcarrier spacing of the reference carrier bandwidth part and the subcarrier spacing of the first carrier bandwidth part.

It should be noted that when the transmission parameter of the first carrier bandwidth part includes another transmission parameter, and the transmission parameter of the reference carrier bandwidth includes a corresponding transmission parameter, for a compensation coefficient corresponding to any power control parameter included in the reference power control parameter, refer to the compensation coefficient corresponding to the reference open-loop power control parameter, the compensation coefficient corresponding to the reference closed-loop power control parameter, or the compensation coefficient corresponding to the reference downlink path loss estimate. Examples are not described one by one herein.

Certainly, the terminal device may alternatively determine, in another possible implementation, the first power control parameter corresponding to the first carrier bandwidth part based on the reference power control parameter, the transmission parameter corresponding to the reference carrier bandwidth part, and the transmission parameter of the first carrier bandwidth part. This is not limited in this embodiment of this application.

In a third implementation, if the power control parameter indication information includes the reference power control parameter, and the reference power control parameter may include at least one power control parameter corresponding to the reference transmission parameter, the terminal device determines the first power control parameter corresponding to the first carrier bandwidth part based on the reference power control parameter, the reference transmission parameter, and the transmission parameter of the first carrier bandwidth part.

For an implementation of the reference transmission parameter in this embodiment of this application, refer to the implementations of the transmission parameter of the reference carrier bandwidth part in the foregoing descriptions. Details are not described herein again.

For an implementation of the transmission parameter of the first carrier bandwidth part in this embodiment of this application, refer to the implementations of the transmission parameter of the first carrier bandwidth part in the foregoing descriptions. Details are not described herein again.

For an implementation of the first power control parameter and/or the reference power control parameter in this embodiment of this application, refer to the foregoing related content. Details are not described herein again.

Optionally, the terminal device determines the first power control parameter corresponding to the first carrier bandwidth part based on the reference power control parameter, the reference transmission parameter, the transmission parameter of the first carrier bandwidth part, and third mapping information. The third mapping information includes a mapping relationship between the reference transmission parameter, the transmission parameter of the first carrier bandwidth part, and a compensation offset corresponding to at least one power control parameter included in the reference power control parameter. Optionally, the third mapping information may be predefined, or may be configured by the network device.

For a compensation offset corresponding to any power control parameter included in the reference power control parameter in this embodiment of this application, refer to the compensation offset corresponding to the reference open-loop power control parameter, the compensation offset corresponding to the reference closed-loop power control parameter, or the compensation offset corresponding to the reference downlink path loss estimate in the foregoing descriptions. Details are not described herein again.

Optionally, the terminal device determines the first power control parameter corresponding to the first carrier bandwidth part based on the reference power control parameter, the reference transmission parameter, the transmission parameter of the first carrier bandwidth part, and fourth mapping information. The fourth mapping information includes a mapping relationship between the reference transmission parameter, the transmission parameter of the first carrier bandwidth part, and a compensation coefficient corresponding to at least one power control parameter included in the reference power control parameter. Optionally, the fourth mapping information may be predefined, or may be configured by the network device.

For a compensation coefficient corresponding to any power control parameter included in the reference power control parameter in this embodiment of this application, refer to the compensation coefficient corresponding to the reference open-loop power control parameter, the compensation coefficient corresponding to the reference closed-loop power control parameter, or the compensation coefficient corresponding to the reference downlink path loss estimate in the foregoing descriptions. Details are not described herein again.

Certainly, the terminal device may alternatively determine, in another possible implementation, the first power control parameter corresponding to the first carrier bandwidth part based on the reference power control parameter, the reference transmission parameter, and the transmission parameter of the first carrier bandwidth part. This is not limited in this embodiment of this application.

In this embodiment, when the power control parameter indication information is used to indicate the second power control parameter corresponding to the second carrier bandwidth part allocated by the network device to the terminal device, for a manner of determining, by the terminal device based on the power control parameter indication information, the second power control parameter corresponding to the second carrier bandwidth part, refer to the foregoing manners of "determining, based on the power control parameter indication information, the first power control parameter corresponding to the first carrier bandwidth part". Details are not described herein again.

Optionally, the transmission parameter of the reference carrier bandwidth part or the reference transmission parameter in the foregoing embodiment may include the reference bandwidth (for example, the quantity of RBs included in the reference carrier bandwidth part), and a transmission parameter of the second carrier bandwidth part may include second bandwidth of the second carrier bandwidth part (for example, a quantity of RBs included in the second carrier bandwidth part).

Optionally, the transmission parameter of the reference carrier bandwidth part or the reference transmission parameter in the foregoing embodiment may include the reference subcarrier spacing, and a transmission parameter of the second carrier bandwidth part may include a second subcarrier spacing of the second carrier bandwidth part.

Optionally, the transmission parameter of the reference carrier bandwidth part or the reference transmission parameter in the foregoing embodiment may include the reference cyclic prefix (CP) type, and a transmission parameter of the second carrier bandwidth part may include a second cyclic prefix type of the second carrier bandwidth part.

Optionally, the transmission parameter of the reference carrier bandwidth part or the reference transmission parameter in the foregoing embodiment may include a combination of any two of the reference bandwidth, the reference subcarrier spacing, and the reference cyclic prefix type. Correspondingly, the transmission parameter of the second carrier bandwidth part may also include a combination of any two of the second bandwidth, the second subcarrier spacing, and the second cyclic prefix type. For example, if the transmission parameter of the reference carrier bandwidth part or the reference transmission parameter may include the reference bandwidth and the reference subcarrier spacing, the transmission parameter of the second carrier bandwidth part may also include the second bandwidth and the second subcarrier spacing. For another example, if the transmission parameter of the reference carrier bandwidth part or the reference transmission parameter may include the reference bandwidth and the reference cyclic prefix type, the transmission parameter of the second carrier bandwidth part may also include the second bandwidth and the second cyclic prefix type. For another example, if the transmission parameter of the reference carrier bandwidth part or the reference transmission parameter may include the reference subcarrier spacing and the reference cyclic prefix type, the transmission parameter of the second carrier bandwidth part may also include the second subcarrier spacing and the second cyclic prefix type. For another example, if the transmission parameter of the reference carrier bandwidth part or the reference transmission parameter may include the reference bandwidth, the reference subcarrier spacing, and the reference cyclic prefix type, the transmission parameter of the second carrier bandwidth part may also include the second bandwidth, the second subcarrier spacing, and the second cyclic prefix type.

It should be noted that if the transmission parameter of the reference carrier bandwidth part or the reference transmission parameter includes another type of transmission parameter, the transmission parameter of the second carrier bandwidth part may also include a corresponding transmission parameter. This is not limited in the embodiments of this application.

Optionally, the second power control parameter may include a second open-loop power control parameter, and the reference power control parameter in the foregoing embodiment may include the reference open-loop power control parameter.

Optionally, the second power control parameter may include a second closed-loop power control parameter, and the reference power control parameter in the foregoing embodiment may include the reference closed-loop power control parameter.

Optionally, the second power control parameter may include a second maximum transmit power parameter, and the reference power control parameter in the foregoing embodiment may include the reference maximum transmit power parameter.

Optionally, the second power control parameter may include a second downlink path loss estimate, and the reference power control parameter in the foregoing embodiment may include the reference downlink path loss estimate.

Optionally, when the second carrier bandwidth part is used to send at least one of an SRS and data carried on a PUSCH, the second power control parameter may include a second path loss compensation factor, the reference power control parameter in the foregoing embodiment may include the reference path loss compensation factor.

Optionally, when the second carrier bandwidth part is used to send data carried on a PUCCH, the second power control parameter may include the second PUCCH format related power control parameter, and the reference power control parameter in the foregoing embodiment may include the reference PUCCH format related power control parameter. For example, if the second PUCCH format related power control parameter is $\Delta_{F\_PUCCH,c,BWP2}(F)$, the reference PUCCH format related power control parameter may be $\Delta_{F\_PUCCH}(F)$, if the second PUCCH format related power control parameter is $\Delta_{TxD,c,BWP2}(F')$, the reference PUCCH format related power control parameter may be $\Delta_{TxD}(F')$, or if the second PUCCH format related power control parameter includes $\Delta_{F\_PUCCH,c,BWP2}(F)$ and $\Delta_{TxD,c,BWP2}$, the reference PUCCH format related power control parameter may include $\Delta_{F\_PUCCH}(F)$ and $\Delta_{TxD}(F')$.

Optionally, when the second carrier bandwidth part is used to send data carried on a PUSCH, the second power control parameter may include a combination of at least any two of the second open-loop power control parameter, the second closed-loop power control parameter, the second maximum transmit power parameter, the second downlink path loss estimate, and the second path loss compensation factor, and the reference power control parameter in the foregoing embodiment may correspondingly include a combination of at least any two of the reference open-loop power control parameter, the reference closed-loop power control parameter, the reference maximum transmit power parameter, the reference downlink path loss estimate, and the reference path loss compensation factor.

Optionally, when the second carrier bandwidth part is used to send an SRS, the second power control parameter may include a combination of at least any two of the second open-loop power control parameter, the second closed-loop power control parameter, the second maximum transmit power parameter, the second downlink path loss estimate, and the second path loss compensation factor, and the reference power control parameter in the foregoing embodiment may correspondingly include a combination of at least any two of the reference open-loop power control parameter, the reference closed-loop power control parameter, the reference maximum transmit power parameter, the reference downlink path loss estimate, and the reference path loss compensation factor.

Optionally, when the second carrier bandwidth part is used to send data carried on a PUCCH, the second power control parameter may include a combination of at least any two of the second open-loop power control parameter, the second closed-loop power control parameter, the second maximum transmit power parameter, the second downlink path loss estimate, and the second PUCCH format related power control parameter, and the reference power control parameter in the foregoing embodiment may correspondingly include a combination of at least any two of the reference open-loop power control parameter, the reference closed-loop power control parameter, the reference maximum transmit power parameter, the reference downlink path loss estimate, and the reference PUCCH format related power control parameter.

It should be noted that if the second power control parameter includes another type of power control parameter, the reference power control parameter in the foregoing embodiment may also include a corresponding power control parameter. This is not limited in this embodiment of this application.

In this embodiment, when the power control parameter indication information is used to indicate power control parameters corresponding to at least two carrier bandwidth parts allocated by the network device to the terminal device, for a manner of determining, by the terminal device based on the power control parameter indication information, a power control parameter corresponding to each of the carrier bandwidth parts, refer to the foregoing manners of "determining, based on the power control parameter indication information, the first power control parameter corresponding to the first carrier bandwidth part". Details are not described herein again.

Next, a manner of determining, by the terminal device based on the power control parameter corresponding to each of the at least one carrier bandwidth part, the corresponding transmit power for transmitting data on each carrier bandwidth part is described in detail.

The following part is described by using an example in which the terminal device determines, based on the first power control parameter, the corresponding first transmit power for transmitting data on the first carrier bandwidth part.

When the first carrier bandwidth part is used to send the data carried on the PUSCH, the terminal device substitutes the determined first power control parameter for a corresponding power control parameter in the foregoing formula (1) to determine the first transmit power. For example, when the first power control parameter includes the first open-loop power control parameter (for example, $P_{O\_PUSCH,c,BWP1}$), the terminal device substitutes the first open-loop power control parameter ($P_{O\_PUSCH,c,BWP1}$) for $P_{O\_PUSCH,c}$ in the foregoing formula (1) to determine the first transmit power. For another example, when the first power control parameter includes the first open-loop power control parameter (for example, $P_{O\_PUSCH,c,BWP1}$) and the first path loss compensation factor (for example, $\alpha_{c,BWP1}$), the terminal device substitutes the first open-loop power control parameter ($P_{O\_PUSCH,c,BWP1}$) for $P_{O\_PUSCH,c}$ in the foregoing formula (1) and substitutes the first path loss compensation factor ($\alpha_{c,BWP1}$) for ac in the foregoing formula (1) to determine the first transmit power. It may be understood that when the first power control parameter includes another power control parameter, the another power control parameter is correspondingly substituted for a corresponding power control parameter in the foregoing formula (1) to determine the first transmit power. Examples are not described one by one herein.

When the first carrier bandwidth part is used to send the data carried on the PUCCH, the terminal device substitutes the determined first power control parameter for a corresponding power control parameter in the foregoing formula (3) to determine the first transmit power. For example, when the first power control parameter includes the first open-loop power control parameter (for example, $P_{O\_PUCCH,c,BWP1}$), the terminal device substitutes the first open-loop power control parameter ($P_{O\_PUCCH,c,BWP1}$) for $P_{O\_PUCCH,c}$ in the foregoing formula (3) to determine the first transmit power. For another example, when the first power control parameter includes the first open-loop power control parameter (for example, $P_{O\_PUCCH,c,BWP1}$) and the first downlink path loss estimate (for example, $PL_{c,BWP1}$), the terminal device substitutes the first open-loop power control parameter ($P_{O\_PUCCH,c,BWP1}$) for $P_{O\_PUCCH,c}$ in the foregoing formula (3) and substitutes the first downlink path loss estimate ($PL_{c,BWP1}$) for $PL_c$ in the foregoing formula (3) to determine the first transmit power. It may be understood that when the first power control parameter includes another power control parameter, the another power control parameter is correspondingly substituted for a corresponding power control parameter in the foregoing formula (3) to determine the first transmit power. Examples are not described one by one herein.

When the first carrier bandwidth part is used to send the SRS, the terminal device substitutes the determined first power control parameter for a corresponding power control parameter in the foregoing formula (4) to determine the first transmit power. For example, when the first power control parameter includes the first open-loop power control parameter (for example, $P_{O\_PUSCH,c,BWP1}$), the terminal device substitutes the first open-loop power control parameter (for example, $P_{O\_PUSCH,c,BWP1}$) for $P_{O\_PUSCH,c}$ in the foregoing formula (4) to determine the first transmit power. For another example, when the first power control parameter includes the first open-loop power control parameter (for example, $P_{O\_PUSCH,c,BWP1}$) and the first path loss compensation factor (for example, $\alpha_{c,BWP1}$), the terminal device substitutes the first open-loop power control parameter (for example, $P_{O\_PUSCH,c,BWP1}$) for $P_{O\_PUSCH,c}$ in the foregoing formula (4) and substitutes the first path loss compensation factor (for example, $\alpha_{c,BWP1}$) for ac in the foregoing formula (4) to determine the first transmit power. It may be understood that when the first power control parameter includes another power control parameter, the another power control parameter is correspondingly substituted for a corresponding power control parameter in the foregoing formula (4) to determine the first transmit power. Examples are not described one by one herein.

It should be noted that for a manner of determining, by the terminal device based on a power control parameter corresponding to any carrier bandwidth part, a corresponding transmit power for transmitting data on the carrier bandwidth part, refer to the foregoing manners of "determining, by the terminal device based on the first power control parameter, the corresponding first transmit power for transmitting data on the first carrier bandwidth part". Details are not described herein again.

Step S203: A terminal sends first uplink information on a first carrier bandwidth part based on a first transmit power, and/or sends second uplink information on a second carrier bandwidth part based on a second transmit power.

The first transmit power is determined based on the first power control parameter, and the first power control parameter is determined based on the power control parameter indication information. The second transmit power is determined based on the second power control parameter, and the second power control parameter is determined based on the power control parameter indication information.

In this step, the terminal device determines, based on the power control parameter indication information (used to indicate a power control parameter corresponding to each of at least one carrier bandwidth part allocated by the network device to the terminal device), the power control parameter corresponding to the at least one carrier bandwidth part, determines, based on the power control parameter corresponding to each of the at least one carrier bandwidth part, a corresponding transmit power for transmitting data on each carrier bandwidth part, and then sends uplink information on each carrier bandwidth part based on the corresponding transmit power.

For example, if the power control parameter indication information is used to indicate a power control parameter A corresponding to a carrier bandwidth part A, the terminal device determines, based on the power control parameter indication information, the power control parameter A corresponding to the carrier bandwidth part A, determines, based on the power control parameter A, a transmit power for transmitting data on the carrier bandwidth part A, and then sends uplink information on the carrier bandwidth part A based on the transmit power. The carrier bandwidth part A may be the first carrier bandwidth part in the embodiments of this application, the corresponding power control parameter A may be the first power control parameter, and the corresponding transmit power may be the first transmit power. Alternatively, the carrier bandwidth part A may be the second carrier bandwidth part in this embodiment of this application, the corresponding power control parameter A may be the second power control parameter, and the corresponding transmit power may be the second transmit power.

For another example, if the power control parameter indication information is used to indicate the first power control parameter corresponding to the first carrier bandwidth part and the second power control parameter corresponding to the second carrier bandwidth part, the terminal device determines, based on the power control parameter indication information, the first power control parameter corresponding to the first carrier bandwidth part and the second power control parameter corresponding to the second carrier bandwidth part, determines, based on the first power control parameter, the corresponding first transmit power for transmitting data on the first carrier bandwidth part, and determines, based on the second power control parameter, the corresponding second transmit power for transmitting data on the second carrier bandwidth part, and then sends the first uplink information on the first carrier bandwidth part based on the first transmit power, and sends the second uplink information on the second carrier bandwidth part based on the second transmit power.

Certainly, the power control parameter indication information may be alternatively used to indicate power control parameters corresponding to another quantity of carrier bandwidth parts. Correspondingly, the terminal device determines, based on the power control parameter indication information, the power control parameters corresponding to the carrier bandwidth parts, determines corresponding transmit powers for transmitting data on the carrier bandwidth parts, and then sends uplink information on each carrier bandwidth part based on a corresponding transmit power.

Step S204: The network device receives the first uplink information on the first carrier bandwidth part, and/or receives the second uplink information on the second carrier bandwidth part.

If the power control parameter indication information is used to indicate the power control parameter corresponding to each of the at least one carrier bandwidth part allocated by the network device to the terminal device, the network device receives, on each carrier bandwidth part, uplink information sent by the terminal device.

For example, if the power control parameter indication information is used to indicate the power control parameter A corresponding to the carrier bandwidth part A, the network device receives uplink information on the carrier bandwidth part A. For example, the carrier bandwidth part A may be the first carrier bandwidth part in the embodiments of this application, and the corresponding uplink information may be the first uplink information. Alternatively, the carrier bandwidth part A may be the second carrier bandwidth part in the embodiments of this application, and the corresponding uplink information may be the second uplink information.

For another example, if the power control parameter indication information is used to indicate the first power control parameter corresponding to the first carrier bandwidth part and the second power control parameter corresponding to the second carrier bandwidth part, the network device receives the first uplink information on the first carrier bandwidth part, and receives the second uplink information on the second carrier bandwidth part. A transmit power of the first uplink information is the first transmit power, and a transmit power of the second uplink information is the second transmit power.

Certainly, the power control parameter indication information may be alternatively used to indicate power control parameters corresponding to another quantity of carrier bandwidth parts. Correspondingly, the network device receives, on each carrier bandwidth part, uplink information sent by the terminal device.

In the embodiments of this application, the network device sends the power control parameter indication information to the terminal device, so that the terminal device determines, based on the received power control parameter indication information, the first power control parameter corresponding to the first carrier bandwidth part and the second power control parameter corresponding to the second carrier bandwidth part. Further, the terminal device sends the first uplink information to the network device on the first carrier bandwidth part based on the first transmit power (determined based on the first power control parameter), and sends the second uplink information to the network device on the second carrier bandwidth part based on the second transmit power (determined based on the second power control parameter). It can be learned that the network device configures different power control parameters for the terminal device based on different carrier bandwidth parts, so that the terminal device may send information on different carrier bandwidth parts of a same carrier by using different transmit powers, thereby ensuring uplink signal quality (or uplink coverage) during carrier bandwidth part switching.

Usually, different PUCCH formats are used for PUCCH valid payloads with different sizes. A valid payload is a quantity of information bits carried on a PUCCH. Different PUCCH formats are corresponding to different modulation and coding schemes. For example, a PUCCH format 4 or a PUCCH format 5 is used for a relatively large PUCCH valid payload, and a PUCCH format 1 or a PUCCH format 2 is used for a relatively small PUCCH valid payload.

The PUCCH format 1 or the PUCCH format 2 carries a relatively small PUCCH valid payload, and has a relatively strong orthogonal multiplexing capability, that is, allows a relatively large quantity of users to use different cyclic shifts to send respective PUCCHs in a same RB. Therefore, when a frequency diversity gain deteriorates, a frequency diversity gain may be obtained by reducing multiplexing. Therefore, the PUCCH format 1 or the PUCCH format 2 is insensitive to deterioration of the frequency diversity gain, and power compensation may not need to be performed during carrier bandwidth part switching. However, the PUCCH format 4 or the PUCCH format 5 carries a relatively large PUCCH valid payload, and has a relatively weak orthogonal multiplexing capability. Therefore, the PUCCH format 4 or the PUCCH format 5 is sensitive to deterioration of a frequency diversity gain, and power compensation needs to be performed during carrier bandwidth part switching.

When each carrier bandwidth part in the foregoing embodiment is used to send data carried on a PUCCH, a PUCCH format is not limited (that is, the PUCCH format may be any PUCCH format). Based on the foregoing embodiment, the configuration manner of the first power control parameter is described in this embodiment by using an example in which the first uplink information includes data carried on a first PUCCH (that is, the first carrier bandwidth part is used to send the data carried on the first PUCCH).

Optionally, the first uplink information includes the data carried on the first PUCCH, a PUCCH format of the first PUCCH is a first preset PUCCH format, and the first preset PUCCH format is some or all of first available PUCCH formats. Optionally, the first available PUCCH formats may include but are not limited to at least one of the following formats: a PUCCH format 0, the PUCCH format 1, . . . , and the PUCCH format 5.

In this embodiment, when the first carrier bandwidth part is used to send the data carried on the first PUCCH, the first power control parameter may be configured in at least the following implementations.

In a first implementation, when the first preset PUCCH format is some of the first available PUCCH formats (for example, the PUCCH format 4 or the PUCCH format 5), and the PUCCH format of the first PUCCH is the first preset PUCCH format, the network device may allocate the first power control parameter to the terminal device in the configuration manner, specific to a carrier bandwidth part, provided in the foregoing embodiment. For example, the first power control parameter may include at least one of the following: the first open-loop power control parameter (for example, $P_{O\_PUCCH,c,BWP1}$, or $P_{O\_NOMINAL\_PUCCH,c,BWP1}$ and/or $P_{O\_UE\_PUCCH,c,BWP1}$), the first closed-loop power control parameter (for example, $\delta_{PUCCH,c,BWP1}$ and/or $g_{c,BWP1}(0)$), the first PUCCH format related power control parameter (for example, $\Delta_{F\_PUCCH,c,BWP1}(F)$ and/or $\Delta_{TxD,c\_BWP1}(F')$), the first maximum transmit power parameter (for example, $P_{CMAX,BWP1}(i)$), and the first downlink path loss estimate (for example, $PL_{c,BWP1}$) Certainly, the first power control parameter may further include another parameter. This is not limited in this embodiment of this application.

In a second implementation, when the first preset PUCCH format is some of the first available PUCCH formats (for example, the PUCCH format 4 or the PUCCH format 5), and the PUCCH format of the first PUCCH is a PUCCH format (for example, the PUCCH format 1 or the PUCCH format 2) in the first available PUCCH formats other than the first preset PUCCH format, the network device may allocate the first power control parameter to the terminal device in the configuration manner specific to a cell or a carrier in the foregoing method. For example, the first power control parameter may include at least one of the following: the first open-loop power control parameter (for example, $P_{O\_PUCCH,c,BWP1}$, or $P_{O\_NOMINAL\_PUCCH,c,BWP1}$ and/or $P_{O\_UE\_PUCCH,c,BWP1}$), the first closed-loop power control parameter (for example, $\delta_{PUCCH,c,BWP1}$ and/or $g_{c,BWP1}(0)$), the first PUCCH format related power control parameter (for example, $\Delta_{F\_PUCCH,c,BWP1}(F)$ and/or $\Delta_{TxD,c,BWP1}(F')$), the first maximum transmit power parameter (for example, $P_{CMAX,c,BWP1}(i)$), and the first downlink path loss estimate (for example, $PL_{c,BWP1}$).

In a third implementation, when the first preset PUCCH format is all of the first available PUCCH formats, the network device may allocate the first power control parameter to the terminal device in the configuration manner, specific to a carrier bandwidth part, provided in the foregoing embodiment.

Certainly, the first power control parameter may be alternatively configured in another implementation. This is not limited in this embodiment of this application.

Optionally, when a power control parameter that is corresponding to each carrier bandwidth part and that the power control parameter indication information is used to indicate includes the power control parameter corresponding to the second carrier bandwidth part, the second uplink information includes data carried on a second PUCCH, a PUCCH format of the second PUCCH is a second preset PUCCH format, and the second preset PUCCH format is some or all of second available PUCCH formats. Optionally, the second available PUCCH formats may include but are not limited to at least one of the following formats: the PUCCH format 0, the PUCCH format 1, . . . , and the PUCCH format 5.

In this embodiment, when the second carrier bandwidth part is used to send the data carried on the second PUCCH, the second power control parameter may be configured in at least the following implementations.

In a first implementation, when the second preset PUCCH format is some of the second available PUCCH formats (for example, the PUCCH format 4 or the PUCCH format 5), and the PUCCH format of the second PUCCH is the second preset PUCCH format, the network device may allocate the second power control parameter to the terminal device in the configuration manner, specific to a carrier bandwidth part, provided in the foregoing embodiment. For example, the second power control parameter may include at least one of the following: the second open-loop power control parameter (for example, $P_{O\_PUCCH,c,BWP2}$, or $P_{O\_NOMINAL\_PUCCH,c,BWP2}$ and/or $P_{O\_UE\_PUCCH,c,BWP2}$), the second closed-loop power control parameter (for example, $\delta_{PUCCH,c,BWP2}$ and/or $g_{c,BWP2}(0)$), the second PUCCH format related power control parameter (for example, $\Delta_{F\_PUCCH,c,BWP2}(F)$ and/or $\Delta_{TxD,c,BWP2}(F')$), the second maximum transmit power parameter (for example, $P_{CMAX,c,BWP2}(i)$), and the second downlink path loss estimate (for example, $PL_{c,BWP2}$). Certainly, the second power control parameter may further include another parameter. This is not limited in this embodiment of this application.

In a second implementation, when the second preset PUCCH format is some of the second available PUCCH formats (for example, the PUCCH format 4 or the PUCCH format 5), and the PUCCH format of the second PUCCH is a PUCCH format (for example, the PUCCH format 1 or the PUCCH format 2) in the second available PUCCH formats other than the second preset PUCCH format, the network device may allocate the second power control parameter to the terminal device in the configuration manner specific to a cell or a carrier in the foregoing method. For example, the second power control parameter may include at least one of the following: the second open-loop power control parameter (for example, $P_{O\_PUCCH,c,BWP2}$, or $P_{O\_NOMINAL\_PUCCH,c,BWP2}$ and/or $P_{O\_UE\_PUCCH,c,BWP2}$), the second closed-loop power control parameter (for example, $\Delta_{F\_PUCCH,c,BWP2}$ and/or $g_{c,BWP2}(0)$), the second PUCCH format related power control parameter (for example, $\Delta_{F\_PUCCH,c,BWP2}(F)$ and/or $\Delta_{TxD,c,BWP2}(F')$), the second maximum transmit power parameter (for example, $P_{CMAX,c,BWP2}(i)$), and the second downlink path loss estimate (for example, $PL_{c,BWP2}$).

In a third implementation, when the second preset PUCCH format is all of the second available PUCCH formats, the network device may allocate the second power control parameter to the terminal device in the configuration manner, specific to a carrier bandwidth part, provided in the foregoing embodiment.

Certainly, the second power control parameter may be alternatively configured in another implementation. This is not limited in this embodiment of this application.

It should be noted that when the power control parameter indication information is further used to indicate a power control parameter corresponding to another carrier bandwidth part, and at least one of the another carrier bandwidth part is used to send data carried on a PUCCH, for a configuration manner of a power control parameter corresponding to the at least one carrier bandwidth part, refer to the configuration manner of the first power control parameter. Details are not described herein again.

It should be noted that the first available PUCCH format and the second available PUCCH format may be the same or different. This is not limited in this embodiment of this application.

It can be learned that, in the embodiments of this application, the network device does not need to configure a plurality of power control parameters for each PUCCH format, and therefore signaling overheads generated when the network device sends the power control parameter indication information can be reduced.

According to the foregoing embodiment, the network device may configure, for the terminal device in the configuration manner specific to a carrier bandwidth part, power control parameters corresponding to carrier bandwidth parts, for example, the first power control parameter corresponding to the first carrier bandwidth part and/or the second power control parameter corresponding to the second carrier bandwidth part. The power control parameters corresponding to the carrier bandwidth parts in the foregoing embodiment may be different. It should be noted that when at least two carrier bandwidth parts can share a power control parameter (referred to as a common power control parameter below), the network device may directly allocate, to the terminal device in the configuration manner specific to a cell or a carrier in the foregoing method, the common power control parameter that can be shared by the at least two carrier bandwidth parts.

In this embodiment, the network device may alternatively send, to the terminal device, the common power control parameter that can be shared by the at least two carrier bandwidth parts. Optionally, the common power control parameter may be carried in the power control parameter indication information, or certainly, may be carried in other information. This is not limited in this embodiment of this application. Correspondingly, after determining a power control parameter that is corresponding to at least one carrier bandwidth part and that is configured by the network device in the configuration manner specific to a carrier bandwidth part, and the common power control parameter configured by the network device in the configuration manner specific to a cell or a carrier, the terminal device determines a transmit power corresponding to each carrier bandwidth part based on the common power control parameter and a power control parameter corresponding to each carrier bandwidth part.

For example, after determining the first power control parameter that is corresponding to the first carrier bandwidth part and that is configured by the network device in the configuration manner specific to a carrier bandwidth part, and the common power control parameter configured by the network device in the configuration manner specific to a cell or a carrier, the terminal device determines the first transmit power corresponding to the first carrier bandwidth part based on the common power control parameter and the first power control parameter corresponding to the first carrier bandwidth part.

For another example, after determining the second power control parameter that is corresponding to the second carrier bandwidth part and that is configured by the network device in the configuration manner specific to a carrier bandwidth part, and the common power control parameter configured by the network device in the configuration manner specific to a cell or a carrier, the terminal device determines the second transmit power corresponding to the second carrier bandwidth part based on the common power control parameter and the second power control parameter corresponding to the second carrier bandwidth part.

For another example, after determining the first power control parameter corresponding to the first carrier bandwidth part and the second power control parameter corresponding to the second carrier bandwidth part that are configured by the network device in the configuration manner specific to a carrier bandwidth part, and the common power control parameter configured by the network device in the configuration manner specific to a cell or a carrier, the terminal device determines the first transmit power corresponding to the first carrier bandwidth part based on the common power control parameter and the first power control parameter corresponding to the first carrier bandwidth part, and determines the second transmit power corresponding to the second carrier bandwidth part based on the common power control parameter and the second power control parameter corresponding to the second carrier bandwidth part.

Optionally, when the first carrier bandwidth part is used to send the data carried on the PUSCH, the first power control parameter may include at least one of the following: the first open-loop power control parameter, the first closed-loop power control parameter, the first maximum transmit power parameter, the first downlink path loss estimate, the first path loss compensation factor, and a first resource quantity parameter. Correspondingly, the common power control parameter may include at least one of the following power control parameters other than the power control parameters corresponding to the first power control parameter: a common open-loop power control parameter (for example, $P_{O\_NOMINAL\_PUSCH,c}$), a common closed-loop power control parameter (for example, $f_c(0)$ or $\delta_{PUSCH,c}$), a common maximum transmit power parameter (for example, $P_{CMAX,c}(i)$), a common downlink path loss estimate (for example, $PL_c$), and a common path loss compensation factor (for example, $\alpha_c$). For example, when the first power control parameter includes the first open-loop power control parameter (for example, $P_{O\_UE\_PUSCH,c,BWP1}$), the common power control parameter may include $P_{O\_NOMINAL\_PUSCH,c}$. For another example, when the first power control parameter includes the first closed-loop power control parameter (for example, $\delta_{PUSCH,c,BWP1}$), the common power control parameter may include $f_c(0)$. For another example, when the first power control parameter includes the first closed-loop power control parameter (for example, $f_{c,BWP1}(0)$), the common power control parameter may include $\delta_{PUSCH,c}$.

Optionally, when the first carrier bandwidth part is used to send the data carried on the PUCCH, the first power control parameter may include at least one of the following: the first open-loop power control parameter, the first closed-loop power control parameter, the first maximum transmit power parameter, the first downlink path loss estimate, and the first PUCCH format related power control parameter. Correspondingly, the common power control parameter may include at least one of the following power control parameters other than the power control parameters corresponding to the first power control parameter: a common open-loop power control parameter (for example, $P_{O\_NOMINAL\_PUCCH,c}$), a common closed-loop power control parameter (for example, $g_c(0)$ or $\delta_{PUCCH,c}$), a common maximum transmit power parameter (for example, $P_{CMAX,c}(i)$), a common downlink path loss estimate (for example, PL), and a common PUCCH format related power control parameter (for example, $\Delta_{F\_PUCCH,c}(F)$ and/or $\Delta_{TxD,c}(F')$). For example, when the first power control parameter includes the first open-loop power control parameter (for example, $P_{O\_UE\_PUCCH,c,BWP1}$), the common power control parameter may include $P_{O\_NOMINAL\_PUCCH,c}$. For another example, when the first power control parameter includes the first closed-loop power control parameter (for example, $\delta_{PUCCH,c,BWP1}$), the common power control parameter may include $g_c(0)$. For another example, when the first power control parameter includes the first closed-loop power control parameter (for example, $g_c(0)$), the common power control parameter may include $\delta_{PUCCH,c}$.

Optionally, when the first carrier bandwidth part is used to send the SRS, the first power control parameter may include at least one of the following: the first open-loop power control parameter, the first closed-loop power control parameter, the first maximum transmit power parameter, the first downlink path loss estimate, and the first path loss compensation factor. Correspondingly, the common power control parameter may include at least one of the following power control parameters other than the power control parameters corresponding to the first power control parameter: a common open-loop power control parameter (for example, $P_{O\_NOMINAL\_PUSCH,c}$), a common closed-loop power control parameter (for example, $f_c(0)$ or $\delta_{PUSCH,c}$), a common maximum transmit power parameter (for example, $P_{CMAX,c}(i)$), a common downlink path loss estimate (for example, $PL_c$), and a common path loss compensation factor (for example, $\alpha_c$). For example, when the first power control parameter includes the first open-loop power control parameter (for example, $P_{O\_UE\_PUSCH,c,BWP1}$), the common power control parameter may include $P_{O\_NOMINAL\_PUSCH,c}$. For another example, when the first power control parameter includes the first closed-loop power control parameter (for example, $\delta_{PUSCH,c,BWP1}$), the common power control parameter may include $f_c(0)$. For another example, when the first power control parameter includes the first closed-loop power control parameter (for example, $f_{c,BWP1}(0)$), the common power control parameter may include $\delta_{PUSCH,c}$.

Similarly, when the second carrier bandwidth part is used to send the data carried on the PUSCH, the second power control parameter may include at least one of the following: the second open-loop power control parameter, the second closed-loop power control parameter, the second maximum transmit power parameter, the second downlink path loss estimate, and the second path loss compensation factor. Correspondingly, the common power control parameter may include at least one of the following power control parameters other than the power control parameters corresponding to the second power control parameter: a common open-loop power control parameter (for example, $P_{O\_PUSCH,c}$), a common closed-loop power control parameter (for example, $f_c(i)$), a common maximum transmit power parameter (for example, $P_{CMAX,c}(i)$), a common downlink path loss estimate (for example, $PL_c$), a common path loss compensation factor (for example, $\alpha_c$), and a PUCCH format related power control parameter.

Optionally, when the second carrier bandwidth part is used to send the data carried on the PUCCH, the second power control parameter may include at least one of the following: the second open-loop power control parameter, the second closed-loop power control parameter, the second maximum transmit power parameter, the second downlink path loss estimate, and the second PUCCH format related power control parameter. Correspondingly, the common power control parameter may include at least one of the following power control parameters other than the power control parameters corresponding to the second power control parameter: a common open-loop power control parameter (for example, $P_{O\_PUCCH,c}$), a common closed-loop power control parameter (for example, $g_c(i)$), a common maximum transmit power parameter (for example, $P_{CMAX,c}(i)$), a common downlink path loss estimate (for example, $PL_c$), and a common PUCCH format related power control parameter (for example, $\Delta_{F\_PUCCH,c}(F)$ and/or $\Delta_{TxD,c}(F')$).

Optionally, when the second carrier bandwidth part is used to send the SRS, the second power control parameter may include at least one of the following: the second open-loop power control parameter, the second closed-loop power control parameter, the second maximum transmit power parameter, the second downlink path loss estimate, and the second path loss compensation factor. Correspondingly, the common power control parameter may include at least one of the following power control parameters other than the power control parameters corresponding to the second power control parameter: a common open-loop power control parameter (for example, $P_{O\_PUSCH,c}$), a common closed-loop power control parameter (for example, $f_c(i)$), a common maximum transmit power parameter (for example, $P_{CMAX,c}(i)$), and a common downlink path loss estimate (for example, $PL_c$).

Certainly, the common power control parameter may further include another power control parameter. This is not limited in this embodiment of this application.

The following part is described by using an example in which the terminal device determines the first transmit power corresponding to the first carrier bandwidth part based on the common power control parameter and the first power control parameter corresponding to the first carrier bandwidth part.

When the first carrier bandwidth part is used to send the data carried on the PUSCH, the terminal device substitutes the determined first power control parameter for a corresponding power control parameter in the foregoing formula (1), and determines the first transmit power based on the common power control parameter. For example, when the first power control parameter includes the first open-loop power control parameter (for example, $P_{O\_PUSCH,c,BWP1}$), and the common power control parameter includes the common downlink path loss estimate (for example, $PL_c$), the terminal device substitutes the first open-loop power control parameter (for example, $P_{O\_PUSCH,c,BWP1}$) for $P_{O\_PUSCH,c}$ in the foregoing formula (1), and determines the first transmit power based on the common power control parameter (for example, $PL_c$).

When the first carrier bandwidth part is used to send the data carried on the PUCCH, the terminal device substitutes the determined first power control parameter for a corresponding power control parameter in the foregoing formula (3), and determines the first transmit power based on the common power control parameter. For example, when the first power control parameter includes the first open-loop power control parameter (for example, $P_{O\_PUCCH,c,BWP1}$), and the common power control parameter includes the common downlink path loss estimate (for example, $PL_c$), the terminal device substitutes the first open-loop power control parameter (for example, $P_{O\_PUCCH,c,BWP1}$) for $P_{O\_PUCCH,c}$ in the foregoing formula (3), and determines the first transmit power based on the common power control parameter (for example, $PL_c$).

When the first carrier bandwidth part is used to send the SRS, the terminal device substitutes the determined first power control parameter for a corresponding power control parameter in the foregoing formula (4), and determines the first transmit power based on the common power control parameter. For example, when the first power control parameter includes the first open-loop power control parameter (for example, $P_{O\_PUSCH,c,BWP1}$), and the common power control parameter includes the common downlink path loss estimate (for example, $PL_c$), the terminal device substitutes the first open-loop power control parameter (for example, $P_{O\_PUSCH,c,BWP1}$) for $P_{O\_PUSCH,c}$ in the foregoing formula (4), and determines the first transmit power based on the common power control parameter (for example, $PL_c$).

It should be noted that for a manner of determining, by the terminal device based on the common power control parameter and a power control parameter corresponding to any carrier bandwidth part, a transmit power corresponding to the carrier bandwidth part, refer to the foregoing manners of "determining, by the terminal device, the first transmit power corresponding to the first carrier bandwidth part based on the common power control parameter and the first power control parameter corresponding to the first carrier bandwidth part". Details are not described herein again.

It can be learned that in this embodiment of this application, the network device configures power control parameters for the terminal device in a manner of combining the configuration manner specific to a carrier bandwidth part and the configuration manner specific to a cell or a carrier, thereby achieving an objective of configuring different power control parameters for the terminal device based on different carrier bandwidth parts, so that the terminal device may send information on different carrier bandwidth parts of a same carrier by using different transmit powers.

In the foregoing embodiment provided in this application, the methods provided in the embodiments of this application are described from the perspectives of the network device, the terminal device, and interaction between the network device and the terminal device. To implement the functions in the methods provided in the foregoing embodiments of this application, the network device and the terminal device each may include a hardware structure and/or a software module, to implement the foregoing functions by using the hardware structure, the software module, or a combination of the hardware structure and the software module. Whether one of the foregoing functions is performed by using a hardware structure, a software module, or a combination of a hardware structure and a software module depends on particular applications and design constraints of the technical solutions.

Figure 3:
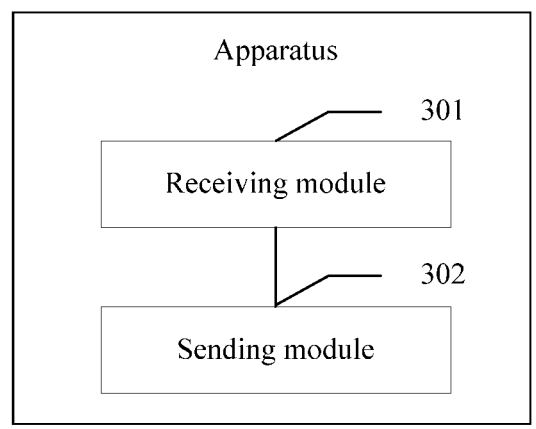
FIG. 3 is a schematic structural diagram of a power control apparatus according to an embodiment of this application.

An embodiment of this application provides an apparatus, configured to implement the functions of the terminal device in the foregoing methods. The apparatus may be a terminal device, or may be an apparatus in a terminal device. FIG. 3 is a schematic structural diagram of an apparatus according to an embodiment of this application. As shown in FIG. 3, the apparatus includes a receiving module 301 and a sending module 302. The receiving module 301 is configured to receive power control parameter indication information. The sending module 302 is configured to send first uplink information on a first carrier bandwidth part based on a first transmit power, where the first transmit power is determined based on a first power control parameter, and the first power control parameter is determined based on the power control parameter indication information. The sending module 302 is further configured to send second uplink information on a second carrier bandwidth part based on a second transmit power, where the second transmit power is determined based on a second power control parameter, and the second power control parameter is determined based on the power control parameter indication information. The first carrier bandwidth part and the second carrier bandwidth part are located in a same carrier.

Specifically, the receiving module 301 and the sending module 302 may perform corresponding functions performed by the terminal device in the method embodiment corresponding to FIG. 2. Details are not described herein again.

Module division in the apparatus embodiments of this application is an example, is merely logical function division, and may be other division in actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 4:
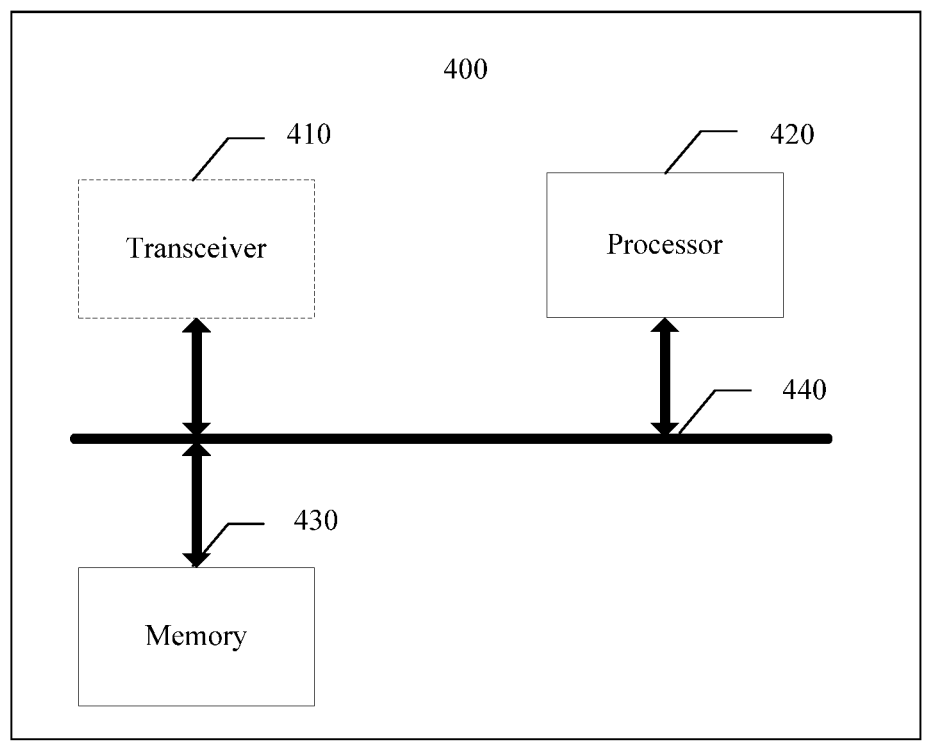
FIG. 4 is a schematic structural diagram of a power control apparatus according to another embodiment of this application.

FIG. 4 is a schematic structural diagram of an apparatus according to another embodiment of this application. As shown in FIG. 4, an apparatus 400 provided in this embodiment of this application is configured to implement the functions of the terminal device in the foregoing method. The apparatus may be a terminal device, or may be an apparatus in a terminal device. The apparatus may be a chip system. In the embodiments of this application, the chip system may include a chip, or may include a chip and another discrete device. The apparatus 400 includes a processor 420, configured to implement the functions of the terminal device in the methods provided in the embodiments of this application. For example, the processor 420 may receive and process power control parameter indication information, generate first uplink information and second uplink information, and send the generated uplink information. For details, refer to the detailed descriptions in the method examples. Details are not described herein again.

The apparatus 400 may further include a memory 430, configured to store a program instruction and/or data. The memory 430 is coupled with the processor 420. Couplings in the embodiments of this application are indirect couplings or communications connections between apparatuses, units, or modules, and may be electrical, mechanical, or in another form, and are used for information exchange between the apparatuses, the units, and the modules. The processor 420 and the memory 430 may perform an operation cooperatively. The processor 420 may invoke and execute the program instruction stored in the memory 430.

The apparatus 400 may further include a transceiver 410, configured to communicate with another device through a transmission medium, so that an apparatus in the apparatus 400 may communicate with another device. For example, the another device may be a network device. The processor 420 sends or receives data by using the transceiver 410, and is configured to implement the method performed by the terminal device in FIG. 2. In an implementation process, steps of a processing procedure may be performed by using an integrated logic circuit of hardware in the processor 420 or an instruction in a form of software.

A specific connection medium between the transceiver 410, the processor 420, and the memory 430 is not limited in this embodiment of this application. In this embodiment of this application, the memory 430, the processor 420, and the transceiver 410 are connected by using a bus 440 in FIG. 4. The bus is represented by using a bold line in FIG. 4. A manner of a connection between other components is merely an example for description, and imposes no limitation. The bus may be classified into an address bus, a data bus, a control bus, or the like. For ease of representation, the bus is represented by using only one bold line in FIG. 4. However, it does not mean that there is only one bus or only one type of bus.

Figure 5:
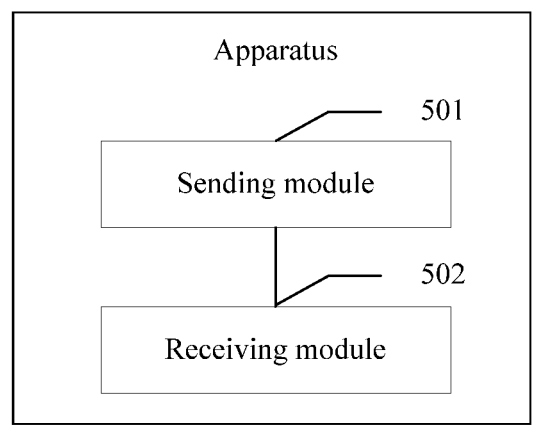
FIG. 5 is a schematic structural diagram of a power control apparatus according to another embodiment of this application.

An embodiment of this application provides an apparatus, configured to implement the functions of the network device in the foregoing methods. The apparatus may be a network device, or may be an apparatus in a network device. FIG. 5 is a schematic structural diagram of an apparatus according to another embodiment of this application. As shown in FIG. 5, the apparatus includes a sending module 501 and a receiving module 502. These modules may perform corresponding functions performed by the network device in the method embodiment corresponding to FIG. 2. The sending module 501 is configured to send power control parameter indication information, where the power control parameter indication information includes a first power control parameter and a second power control parameter, the first power control parameter is used to determine a first transmit power for transmitting data on a first carrier bandwidth part, and the second power control parameter is used to determine a second transmit power for transmitting data on a second carrier bandwidth part. The receiving module 502 is configured to receive first uplink information on the first carrier bandwidth part, where a transmit power of the first uplink information is the first transmit power. The receiving module 502 is further configured to receive second uplink information on the second carrier bandwidth part, where a transmit power of the second uplink information is the second transmit power. The first carrier bandwidth part and the second carrier bandwidth part are located in a same carrier.

Specifically, the sending module 501 and the receiving module 502 may perform the corresponding functions performed by the network device in the method embodiment corresponding to FIG. 2. Details are not described herein again.

Figure 6:
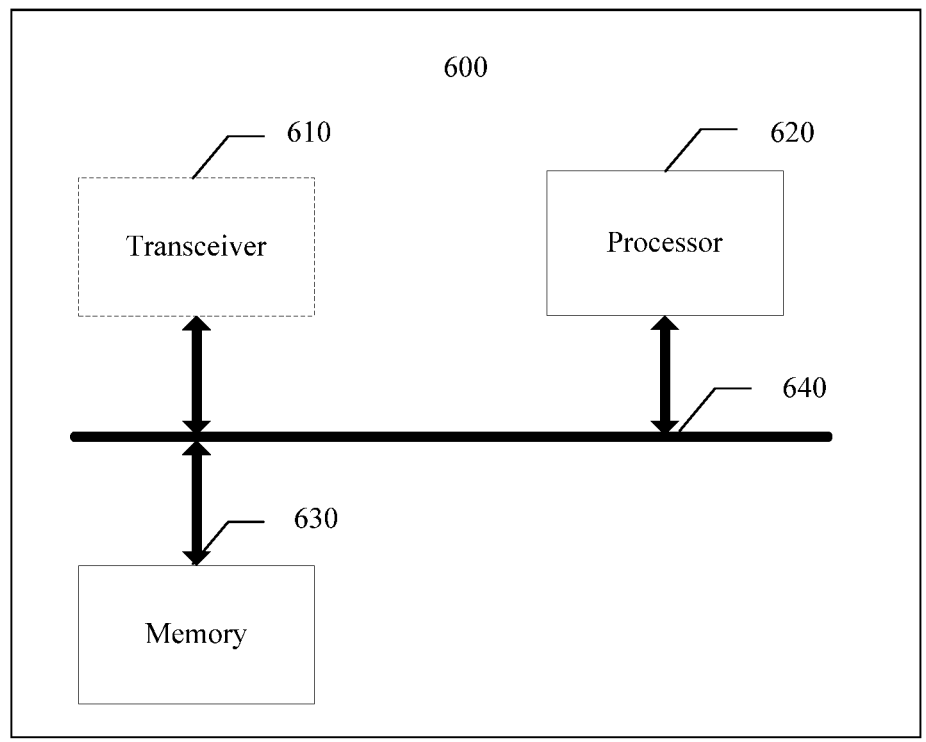
FIG. 6 is a schematic structural diagram of a power control apparatus according to another embodiment of this application.

FIG. 6 is a schematic structural diagram of an apparatus according to another embodiment of this application. As shown in FIG. 6, an apparatus 600 provided in this embodiment of this application is configured to implement the functions of the network device in the foregoing method. The apparatus may be a network device, or may be an apparatus in a network device. The apparatus may be a chip system. The apparatus 600 includes a processor 620, configured to implement the functions of the network device in the methods provided in the embodiments of this application. For example, the processor 620 may generate and send power control parameter indication information, and receive first uplink information and second uplink information. For details, refer to the detailed descriptions in the method example. Details are not described herein again.

The apparatus 600 may further include a memory 630, configured to store a program instruction and/or data. The memory 630 is coupled with the processor 620. Couplings in the embodiments of this application are indirect couplings or communications connections between apparatuses, units, or modules, and may be electrical, mechanical, or in another form, and are used for information exchange between the apparatuses, the units, and the modules. The processor 620 and the memory 630 may perform an operation cooperatively. The processor 620 may invoke and execute the program instruction stored in the memory 630.

The apparatus 600 may further include a transceiver 610, configured to communicate with another device through a transmission medium, so that an apparatus in the apparatus 600 may communicate with another device. For example, the another device may be a terminal device. The processor 620 sends or receives data by using the transceiver 610, and is configured to implement the method performed by the network device in the embodiment corresponding to FIG. 2. Further, the processor 620 may process data received by the transceiver 610.

A specific connection medium between the transceiver 610, the processor 620, and the memory 630 is not limited in this embodiment of this application. In this embodiment of this application, the memory 630, the processor 620, and the transceiver 610 are connected by using a bus 640 in FIG. 6. The bus is represented by using a bold line in FIG. 6. A manner of a connection between other components is merely an example for description, and imposes no limitation. The bus may be classified into an address bus, a data bus, a control bus, or the like. For ease of representation, the bus is represented by using only one bold line in FIG. 6. However, it does not mean that there is only one bus or only one type of bus.

In the embodiments of this application, the processor may be a general purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general purpose processor may be a microprocessor, any conventional processor, or the like. The steps of the method disclosed with reference to the embodiments of this application may be directly performed by a hardware processor, or may be performed by using a combination of hardware in the processor and a software module.

In the embodiments of this application, the memory may be a nonvolatile memory, such as a hard disk drive (HDD) or a solid-state drive (SSD), or may be a volatile memory (volatile memory), such as a random access memory (RAM). The memory is any other medium that can be configured to carry or store expected program code in a form of an instruction or a data structure and that can be accessed by a computer, but is not limited thereto.

An embodiment of this application further provides a communications system. The communications system includes a network device and at least one terminal device. The network device may be of the structure in the apparatus embodiment shown in FIG. 5 and/or FIG. 6. Correspondingly, the network device may perform the technical solutions provided in the power control method embodiment. The terminal device may be of the structure in the apparatus embodiment shown in FIG. 3 and/or FIG. 4. Correspondingly, the terminal device may perform the technical solutions provided in the power control method embodiment. Specific implementation principles and technical effects thereof are similar. Details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communications connections may be implemented by using some interfaces. The indirect couplings or communications connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of hardware and a software function unit.

A person of ordinary skill in the art may understand that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, some or all of the procedures or functions according to the embodiments of this application are generated. The computer may be a general purpose computer, a dedicated computer, a computer network, or another programmable apparatus. The computer instructions may be stored in a computer readable storage medium or transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state drive (SSD)), or the like.

The foregoing descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The following examples are provided:

Example 1

A power control method, comprising: receiving power control parameter indication information, and sending uplink information on a bandwidth part based on a transmit power, wherein the transmit power is determined based on a power control parameter specific to the bandwidth part, and the power control parameter specific to the bandwidth part is determined based on the power control parameter indication information.

Example 2

The method according to example 1, wherein the power control parameter specific to the bandwidth part comprises an open-loop power control parameter specific to the bandwidth part, a closed-loop power control parameter specific to the bandwidth part, and/or a downlink path loss estimate specific to the bandwidth part.

Example 3

The method according to example 1 or 2, wherein that the power control parameter specific to the bandwidth part is determined based on the power control parameter indication information comprises the power control parameter specific to the bandwidth part is determined based on a reference power control parameter, a reference transmission parameter, and a transmission parameter of the bandwidth part, wherein the reference power control parameter is determined based on the power control parameter indication information.

Example 4

The method according to example 3, wherein the reference transmission parameter comprises reference bandwidth, and the transmission parameter of the bandwidth part comprises bandwidth of the bandwidth part, the reference transmission parameter comprises a reference subcarrier spacing, and the transmission parameter of the bandwidth part comprises a subcarrier spacing of the bandwidth part, and/or the reference transmission parameter comprises a reference cyclic prefix type, and the transmission parameter of the bandwidth part comprises a cyclic prefix type of the bandwidth part.

Example 5

The method according to example 3 or 4, wherein the power control parameter specific to the bandwidth part comprises the open-loop power control parameter specific to the bandwidth part, and the reference power control parameter comprises a reference open-loop power control parameter, and/or the power control parameter specific to the bandwidth part comprises the closed-loop power control parameter specific to the bandwidth part, and the reference power control parameter comprises a reference closed-loop power control parameter.

Example 6

The method according to any one of examples 1 to 5, wherein the uplink information comprises data carried on a physical uplink control channel (PUCCH), a PUCCH format of the PUCCH is a preset PUCCH format of the bandwidth part, and the preset PUCCH format of the bandwidth part is some or all of available PUCCH formats of the bandwidth part.

Example 7

The method according to any one of examples 1 to 6, wherein that the transmit power is determined based on a power control parameter specific to the bandwidth part comprises the transmit power is determined based on the power control parameter specific to the bandwidth part and a common power control parameter, wherein the common power control parameter is a common power control parameter of a carrier in which the bandwidth part is located.

Example 8

The method according to example 7, wherein the method further comprises receiving the common power control parameter.

Example 9

The method according to example 7 or 8, wherein the common power control parameter comprises a common open-loop power control parameter.

Example 10

The method according to any one of examples 2, 5, and 9, wherein the open-loop power control parameter comprises an expected receive power.

Example 11

The method according to example 2 or 5, wherein the closed-loop power control parameter comprises an initial value of a power adjustment value.

Example 12

A power control method, comprising sending power control parameter indication information, wherein the power control parameter indication information is used to indicate a power control parameter specific to a bandwidth part, and receiving uplink information on the bandwidth part.

Example 13

The method according to example 12, wherein the power control parameter specific to the bandwidth part comprises an open-loop power control parameter specific to the bandwidth part, a closed-loop power control parameter specific to the bandwidth part, and/or a downlink path loss estimate specific to the bandwidth part.

Example 14

The method according to example 12 or 13, wherein the uplink information comprises data carried on a physical uplink control channel (PUCCH), a PUCCH format of the PUCCH is a preset PUCCH format of the bandwidth part, and the preset PUCCH format of the bandwidth part is some or all of available PUCCH formats of the bandwidth part.

Example 15

The method according to any one of examples 12 to 14, wherein the method further comprises sending a common power control parameter, wherein the common power control parameter is a common power control parameter of a carrier in which the bandwidth part is located.

Example 16

The method according to example 15, wherein the common power control parameter comprises a common open-loop power control parameter.

Example 17

The method according to example 13 or 16, wherein the open-loop power control parameter comprises an expected receive power.

Example 18

The method according to example 13, wherein the closed-loop power control parameter comprises an initial value of a power adjustment value.

Example 19

A communications apparatus, comprising a processor and a transceiver, wherein the processor receives power control parameter indication information by using the transceiver, and the processor sends uplink information on a bandwidth part based on a transmit power by using the transceiver, wherein the transmit power is determined based on a power control parameter specific to the bandwidth part, and the power control parameter specific to the bandwidth part is determined based on the power control parameter indication information.

Example 20

The communications apparatus according to example 19, wherein the power control parameter specific to the bandwidth part comprises an open-loop power control parameter specific to the bandwidth part, a closed-loop power control parameter specific to the bandwidth part, and/or a downlink path loss estimate specific to the bandwidth part.

Example 21

The communications apparatus according to example 19 or 20, wherein that the power control parameter specific to the bandwidth part is determined based on the power control parameter indication information comprises the power control parameter specific to the bandwidth part is determined based on a reference power control parameter, a reference transmission parameter, and a transmission parameter of the bandwidth part, wherein the reference power control parameter is determined based on the power control parameter indication information.

Example 22

The communications apparatus according to example 21, wherein the reference transmission parameter comprises reference bandwidth, and the transmission parameter of the bandwidth part comprises bandwidth of the bandwidth part, the reference transmission parameter comprises a reference subcarrier spacing, and the transmission parameter of the bandwidth part comprises a subcarrier spacing of the bandwidth part, and/or the reference transmission parameter comprises a reference cyclic prefix type, and the transmission parameter of the bandwidth part comprises a cyclic prefix type of the bandwidth part.

Example 23

The communications apparatus according to example 21 or 22, wherein the power control parameter specific to the bandwidth part comprises the open-loop power control parameter specific to the bandwidth part, and the reference power control parameter comprises a reference open-loop power control parameter, and/or the power control parameter specific to the bandwidth part comprises the closed-loop power control parameter specific to the bandwidth part, and the reference power control parameter comprises a reference closed-loop power control parameter.

Example 24

The communications apparatus according to any one of examples 19 to 23, wherein the uplink information comprises data carried on a physical uplink control channel (PUCCH), a PUCCH format of the PUCCH is a preset PUCCH format of the bandwidth part, and the preset PUCCH format of the bandwidth part is some or all of available PUCCH formats of the bandwidth part.

Example 25

The communications apparatus according to any one of examples 19 to 24, wherein that the transmit power is determined based on a power control parameter specific to the bandwidth part comprises the transmit power is determined based on the power control parameter specific to the bandwidth part and a common power control parameter, wherein the common power control parameter is a common power control parameter of a carrier in which the bandwidth part is located.

Example 26

The communications apparatus according to example 25, wherein the processor receives the common power control parameter by using the transceiver.

Example 27

The communications apparatus according to example 25 or 26, wherein the common power control parameter comprises a common open-loop power control parameter.

Example 28

The communications apparatus according to any one of examples 20, 23, and 27, wherein the open-loop power control parameter comprises an expected receive power.

Example 29

The communications apparatus according to example 20 or 23, wherein the closed-loop power control parameter comprises an initial value of a power adjustment value.

Example 30

A communications apparatus, configured to implement the method according to any one of examples 1 to 11.

Example 31

An apparatus, comprising a processor and a memory, wherein the memory is configured to store a program instruction, and the processor is configured to invoke and execute the program instruction stored in the memory, to implement the method according to any one of examples 1 to 11.

Example 32

A communications apparatus, comprising a processor and a transceiver, wherein the processor sends power control parameter indication information by using the transceiver, wherein the power control parameter indication information is used to indicate a power control parameter specific to a bandwidth part, and the processor receives uplink information on the bandwidth part by using the transceiver.

Example 33

The communications apparatus according to example 32, wherein the power control parameter specific to the bandwidth part comprises an open-loop power control parameter specific to the bandwidth part, a closed-loop power control parameter specific to the bandwidth part, and/or a downlink path loss estimate specific to the bandwidth part.

Example 34

The communications apparatus according to example 32 or 33, wherein the uplink information comprises data carried on a physical uplink control channel (PUCCH), a PUCCH format of the PUCCH is a preset PUCCH format of the bandwidth part, and the preset PUCCH format of the bandwidth part is some or all of available PUCCH formats of the bandwidth part.

Example 35

The communications apparatus according to any one of examples 32 to 34, wherein the processor sends a common power control parameter by using the transceiver, and the common power control parameter is a common power control parameter of a carrier in which the bandwidth part is located.

Example 36

The communications apparatus according to example 35, wherein the common power control parameter comprises a common open-loop power control parameter.

Example 37

The communications apparatus according to example 33 or 36, wherein the open-loop power control parameter comprises an expected receive power.

Example 38

The communications apparatus according to example 33, wherein the closed-loop power control parameter comprises an initial value of a power adjustment value.

Example 39

A communications apparatus, configured to implement the method according to any one of examples 12 to 18.

Example 40

An apparatus, comprising a processor and a memory, wherein the memory is configured to store a program instruction, and the processor is configured to invoke and execute the program instruction stored in the memory, to implement the method according to any one of examples 12 to 18.

Example 41

A computer readable storage medium, wherein the computer readable storage medium stores an instruction, and when the instruction runs on a computer, the computer is enabled to perform the method according to any one of examples 1 to 18.

Example 42

A computer program product comprising an instruction, wherein when the instruction runs on a computer, the computer is enabled to perform the method according to any one of examples 1 to 18.

Example 43

A communications system, comprising the apparatus according to any one of examples 19 to 31, and the apparatus according to any one of examples 32 to 40.

What is claimed is:

1. A power control method, comprising:
   receiving indication information, wherein the indication information indicates a power control parameter for a first bandwidth part, which is specific to a terminal device; and
   sending uplink information on the first bandwidth part by using a transmit power, wherein the transmit power is based on the power control parameter specific to the first bandwidth part and is based on a common power control parameter of one single carrier in which at least the first bandwidth part and a second bandwidth part of the terminal device are disposed, wherein the common power control parameter is common to the first bandwidth part and the second bandwidth part.

2. The method according to claim 1, wherein the power control parameter specific to the first bandwidth part is independent of another power control parameter specific to another bandwidth part.

3. The method according to claim 1, wherein the power control parameter specific to the first bandwidth part comprises an open-loop power control parameter specific to the first bandwidth part.

4. The method according to claim 1, wherein the power control parameter specific to the first bandwidth part comprise a power offset of an expected power for demodulation.

5. The method according to claim 1, wherein the method further comprises receiving the common power control parameter.

6. The method according to claim 1, wherein the common power control parameter comprises a common open-loop power control parameter.

7. The method according to claim 1, wherein the common power control parameter comprises an expected power for demodulation.

8. A communications apparatus, comprising
a receiver, configured to receive indication information, wherein the indication information indicates a power control parameter for a first bandwidth part, which is specific to a terminal device; and
a transmitter, configured to send uplink information on the first bandwidth part by using a transmit power, wherein the transmit power is based on the power control parameter specific to the first bandwidth part and is based on a common power control parameter of one single carrier in which at least the first bandwidth part and a second bandwidth part of the terminal device are disposed, wherein the common power control parameter is common to the first bandwidth part and the second bandwidth part.

9. The communications apparatus according to claim 8, wherein the power control parameter specific to the first bandwidth part is independent of another power control parameter specific to another bandwidth part.

10. The communications apparatus according to claim 8, wherein the power control parameter specific to the first bandwidth part comprises an open-loop power control parameter specific to the bandwidth part.

11. The communications apparatus according to claim 8, wherein the power control parameter specific to the first bandwidth part comprise a power offset of an expected power for demodulation.

12. The communications apparatus according to claim 8, wherein the receiver is further configured to receive the common power control parameter.

13. The communications apparatus according to claim 8, wherein the common power control parameter comprises a common open-loop power control parameter.

14. The communications apparatus according to claim 8, wherein the common power control parameter comprises an expected power for demodulation.

15. An apparatus, comprising:
a processor; and
a non-transitory computer-readable storage medium storing a program to be executed by the processor, wherein the program includes instructions to:
receive indication information, wherein the indication information indicates a power control parameter for a first bandwidth part, which is specific to a terminal device; and
send uplink information on the first bandwidth part by using a transmit power, wherein the transmit power is based on the power control parameter specific to the first bandwidth part and is based on a common power control parameter of one single carrier in which at least the first bandwidth part and a second bandwidth part of the terminal device are disposed, wherein the common power control parameter is common to the first bandwidth part and the second bandwidth part.

16. The apparatus according to claim 15, wherein the power control parameter specific to the first bandwidth part is independent of another power control parameter specific to another first bandwidth part.

17. The apparatus according to claim 15, wherein the power control parameter specific to the first bandwidth part comprises an open-loop power control parameter specific to the first bandwidth part.

18. The apparatus according to claim 15, wherein the power control parameter specific to the first bandwidth part comprise a power offset of an expected power for demodulation.

19. The apparatus according to claim 15, the program further includes instructions to receive the common power control parameter.

20. The apparatus according to claim 15, wherein the common power control parameter comprises a common open-loop power control parameter.

21. The apparatus according to claim 15, wherein the common power control parameter comprises an expected power for demodulation.

22. A non-transitory computer readable medium, wherein the non- transitory computer readable medium stores instructions, and when the instructions run on a computer, the computer is enabled to:
receive indication information, wherein the indication information indicates a power control parameter for a first bandwidth part, which is specific to a terminal device; and
send uplink information on the first bandwidth part by using a transmit power, wherein the transmit power is based on the power control parameter specific to the first bandwidth part and is based on a common power control parameter of one single carrier in which at least the first bandwidth part and a second bandwidth part of the terminal device are disposed, wherein the common power control parameter is common to the first bandwidth part and the second bandwidth part.

* * * * *